Nov. 1, 1966        G. M. STEIN ETAL        3,283,281
                    ELECTRICAL APPARATUS
Filed May 10, 1965                          7 Sheets-Sheet 1
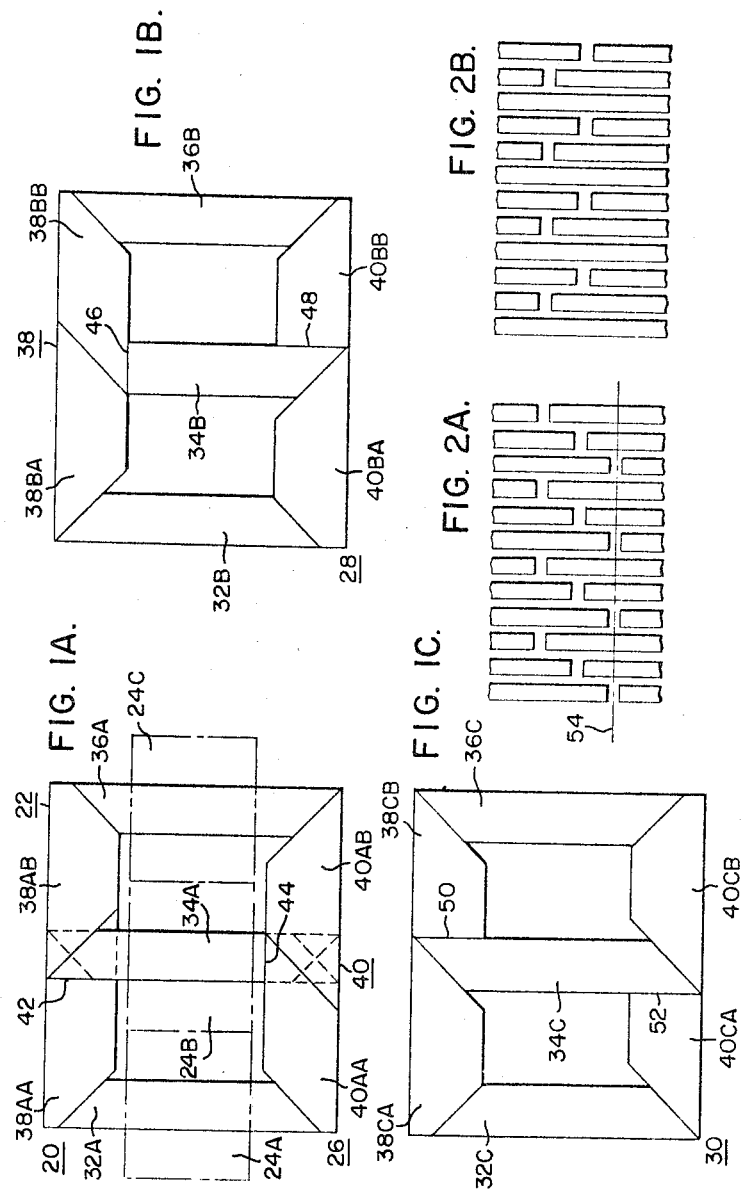
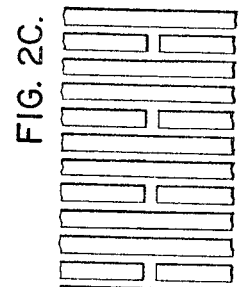
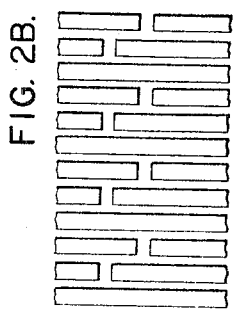
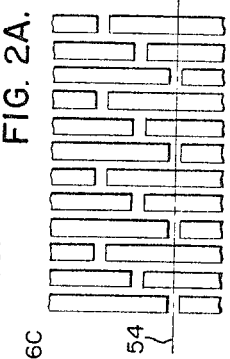
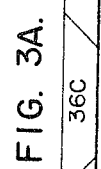
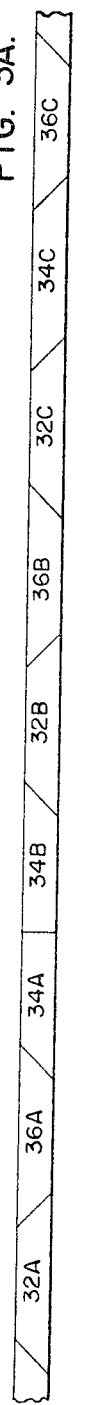
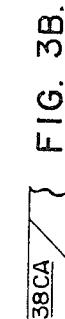

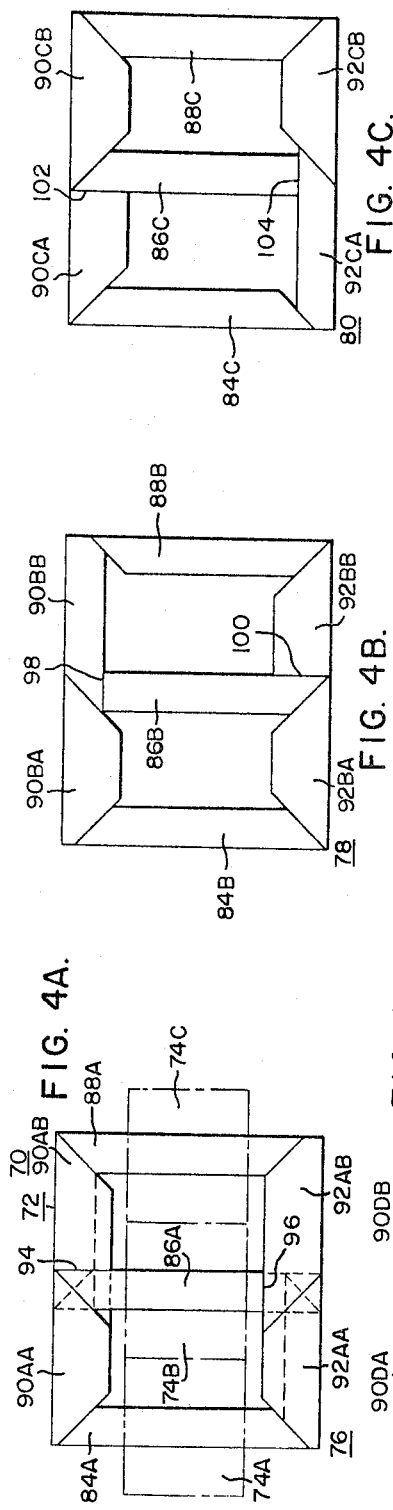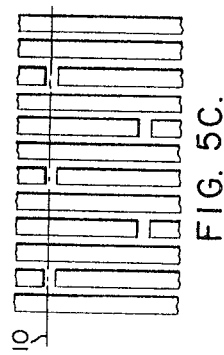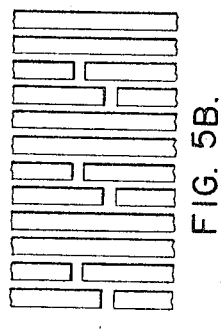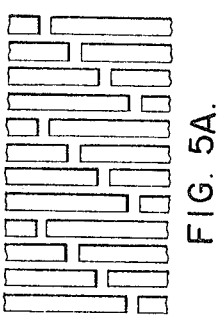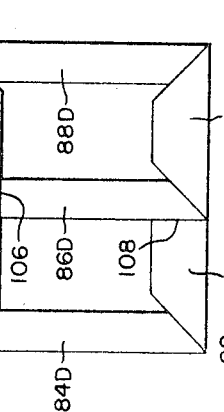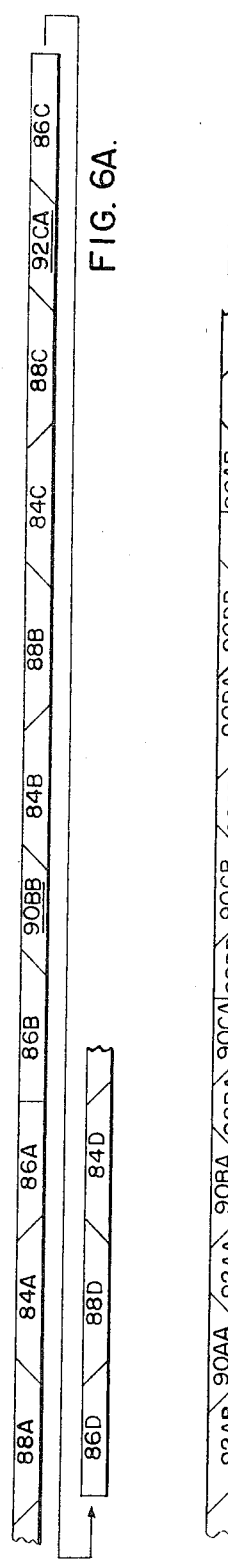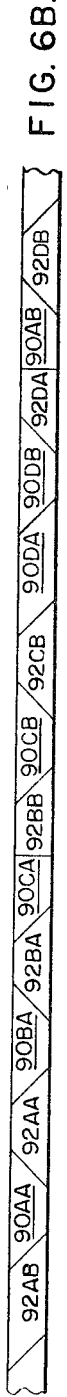

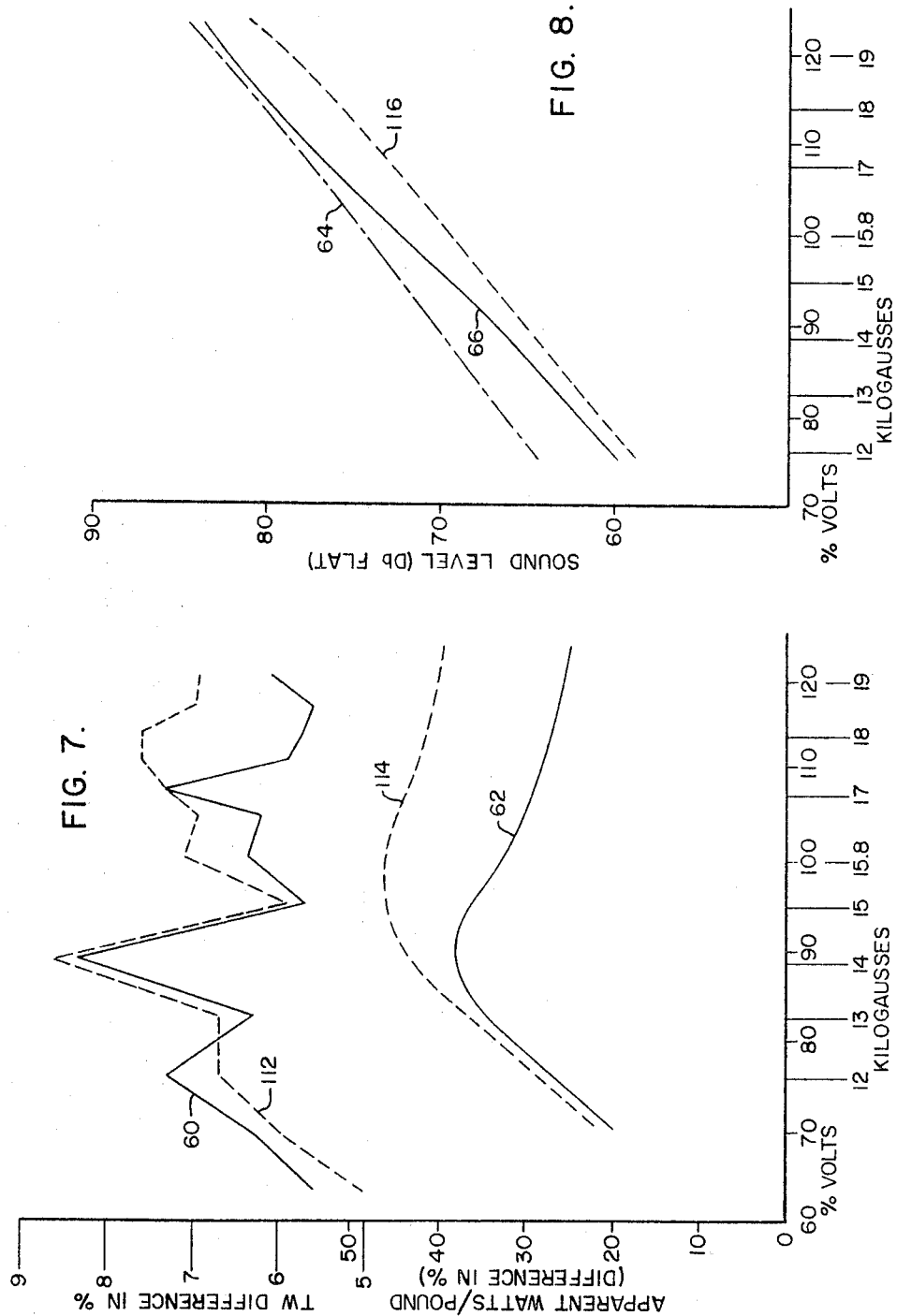

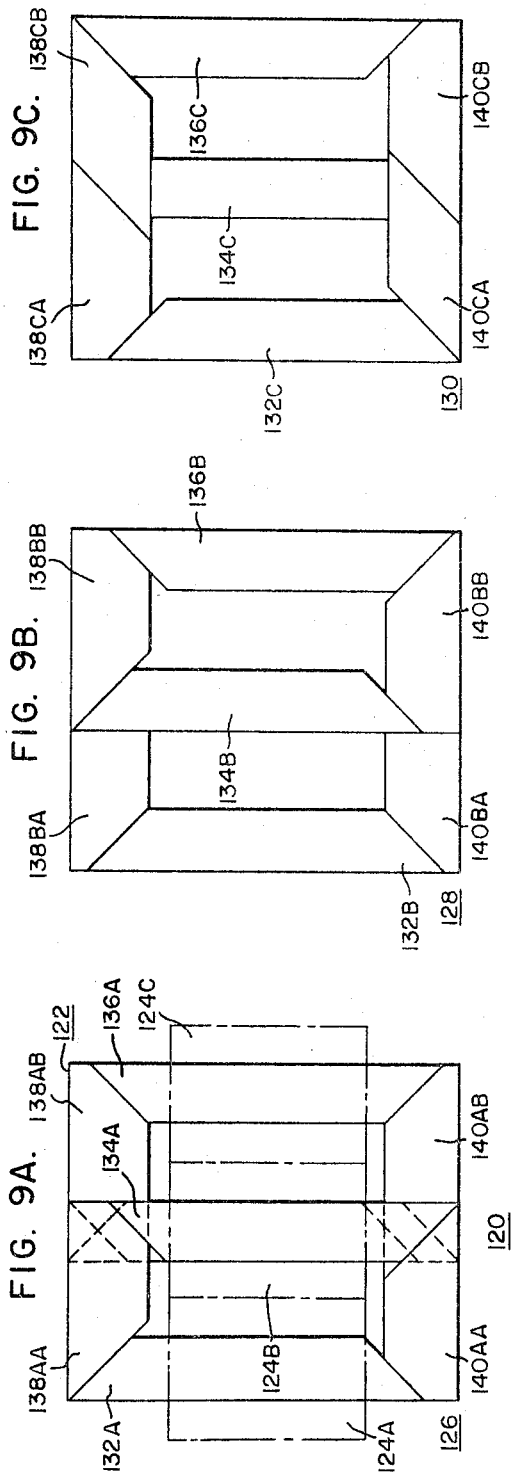
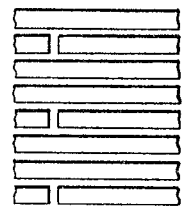
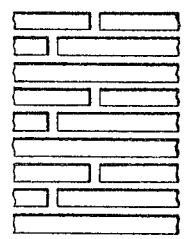
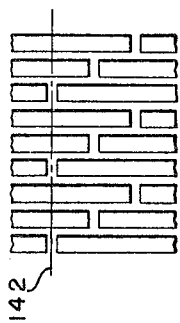

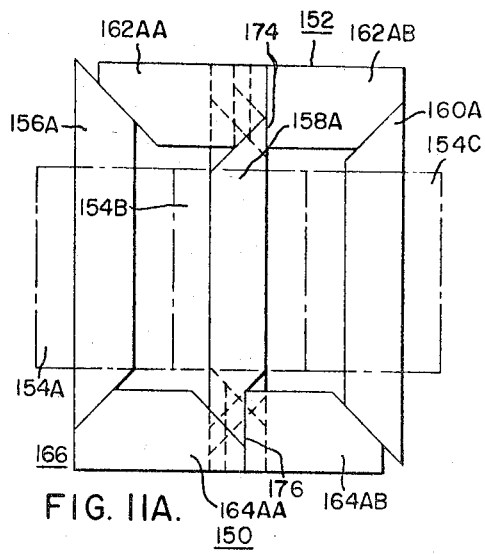
FIG. 11A.
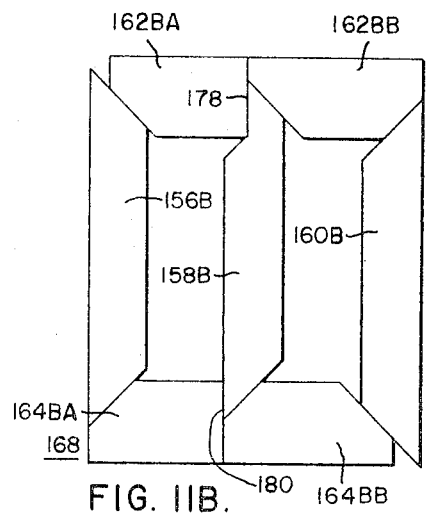
FIG. 11B.
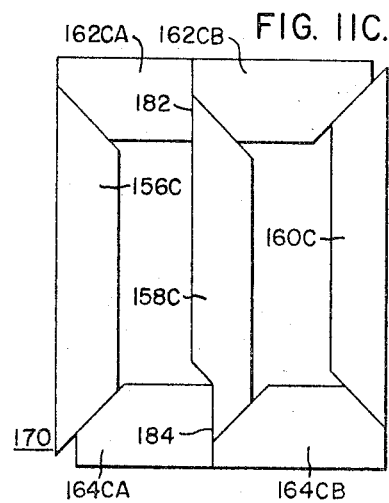
FIG. 11C.
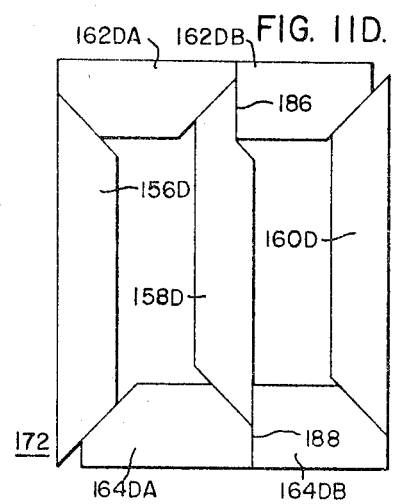
FIG. 11D.
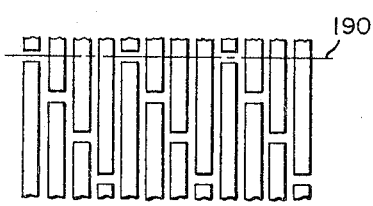
FIG. 12A.
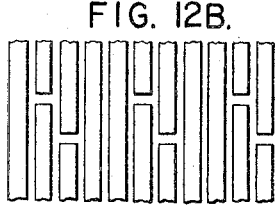
FIG. 12B.
FIG. 13A.
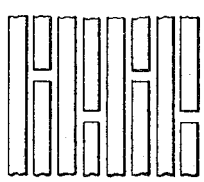
FIG. 13B.

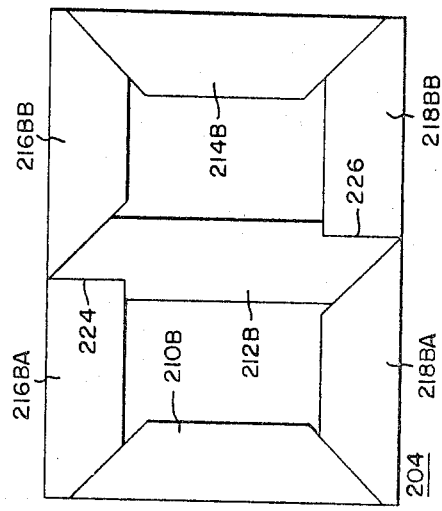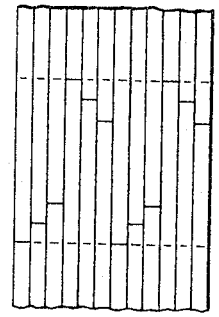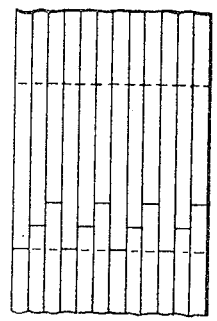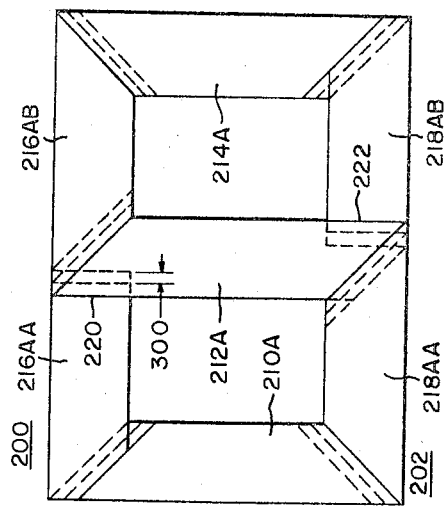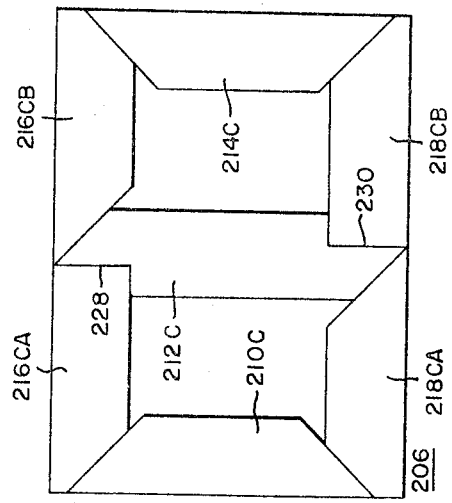

Nov. 1, 1966  G. M. STEIN ET AL  3,283,281

ELECTRICAL APPARATUS

Filed May 10, 1965  7 Sheets-Sheet 7

United States Patent Office 3,283,281
Patented Nov. 1, 1966

3,283,281
ELECTRICAL APPARATUS
Gerhard M. Stein, Sharon, Gerald J. Hattrup, Sharpsville, and Charles E. Burkhardt, Sharon, Pa., assignors to Westinghouse Electric Corporation, Pittsburgh, Pa., a corporation of Pennsylvania
Filed May 10, 1965, Ser. No. 454,615
20 Claims. (Cl. 336—217)

This invention relates in general to magnetic cores for electrical inductive apparatus, such as transformers, and more particularly to new and improved magnetic core structures of the stacked type which facilitate low scrap production, without sacrificing performance.

Conventional three-phase magnetic cores of the stacked type for electrical transformers, such as taught by U.S. Patent No. 2,300,964 issued November 3, 1942 to H. V. Putman, commonly employ diagonal joints at the outer corners of the core, and an inner leg which has two diagonal cuts on each of its ends, in order to increase the length of the joints and thus reduce the flux density, and in order to reduce losses by better utilizing the directional properties of cold rolled silicon steel. This type core has long been the standard in the electrical industry because of its improved performance over cores having all square joints, such as the I-plate core.

Experimental studies have proven that the directional advantage of the diagonal joint over the square joint is very small, and represents, for example, at each outer corner of the core, only about one percent of the total true watt loss. At the inside leg, the directional advantage is negligible, since the magnetic field is rotating due to the three-phase excitation of the core. On the other hand, experimental studies of a considerable number of magnetic core configurations, indicate that the losses in the square joints are three to seven times higher than losses in diagonal joints, and, therefore, much larger than can be explained by the difference in joint size. This great improvement of the diagonal joint over the square joint seems to be the result of a wedging effect which seats the diagonal joints tighter than the square joints, and of the greater joint area of the diagonal joint.

In order to form the two diagonal joints on each end of the inner leg of a three-phase core, the ends of the inner leg are sheared into a V shape, with the resultant scrap representing approximately 4% of the total average core weight. Attempts to eliminate this scrap involve the reintroduction of square joints between the ends of the inside leg and its cooperating yoke portions, with the disadvantage of the higher losses in these joints.

Another influence upon magnetic core design which is becoming increasingly more important, is the desirability of providing magnetic core structures which lend themselves to automatic or semi-automatic production. Again, it is the inner leg of the three-phase magnetic core that presents a problem, as two diagonal cuts on the end of a lamination complicate automatic shearing. It would be desirable to perform all of the cutting of the laminations with an oscillating shear, while the V cut requires the more expensive die shearing.

Thus, it would be desirable to provide a new and improved magnetic core structure for polyphase electrical inductive apparatus, which produces little or no scrap, facilitates automatic or semi-automatic production, and which achieves these objectives without sacrificing magnetic performance.

Accordingly, it is an object of the invention to provide a new and improved magnetic core structure for electrical inductive apparatus.

Another object of the invention is to provide a new and improved magnetic core structure for electrical inductive apparatus which may be formed with a minimum of scrap.

A further object of the invention is to provide a new and improved magnetic core structure for polyphase transformers which lends itself to semi-automatic production.

Still another object of the invention is to provide a new and improved magnetic core structure for transformers which is substantially scrapless, and which facilitates semi-automatic production without sacrificing magnetic efficiency.

Briefly, the present invention accomplishes the above-cited objects by providing a new and improved magnetic core structure having all distributed joints, at least three different punching layer structures, a minimum number of square joints per layer, and a minimum number of different layer structures for obtaining this minimum number of square joints for a predetermined joint distribution pattern. It has been found that the previously experienced high losses associated with square joints can be reduced, to make a core having a minimum number of square joints competitive loss-wise with prior art cores having diagonal joints, if the square joints were to be distributed. Although the number of joint sections increases with a larger distribution of joints, the losses in the core are reduced considerably faster due to the distribution than they increase due to an increased number of joints. It has been found that in order to provide a low scrap core, and eliminate the two diagonal cuts on the ends of the inner leg, without sacrificing magnetic performance, the number of square joints per layer should not exceed two, that there should be at least three different punching layer structures, and there should be at least two intervening layers of laminations before a joint repeats in the same plane. The magnetic core should be constructed with a minimum number of lamination shapes and a minimum number of different lamination layer structures to accomplish the above objectives, in order to prevent unduly complicating the core structure and keep the manufacturing cost of the core structure at a minimum.

In describing magnetic cores which possess these characteristics, the terms "stepped joints" and "major joints" will be used to aid in distinguishing the different types of distributed joints utilized in the invention. The term "stepped joints" will be used to describe the type of distributed joint formed when the layer joints are parallel to one another and offset by small increments. The term "major joints" is used to describe distributed joints which are not merely offset from one another by small increments, but are distributed into a plurality of different planes, which are either not parallel to one another, or if parallel, are disposed a relatively great distance apart.

One principle of the invention accomplishes the objects of the invention by utilizing all major joints between the inner leg laminations and the adjoining yoke laminations. Another principle of the invention accomplishes the objects of the invention by utilizing all stepped joints between the inner leg laminations and the adjoining yoke laminations. Still another principle of the invention accomplishes the objects by utilizing a plurality of major joints at the inner leg, with one or more of the major joints being stepped, which produces a core having the advantages of each type of joint distribution, but which eliminates the disadvantages of each type of joint distribution if used alone. Still another principle of the invention utilizes all stepped joints between one of the yoke members and the inner leg member, and a plurality of major joints, having one or more of the major joints stepped, between the other yoke member and the inner leg member. This latter arrangement facilitates the assembly of the magnetic core.

Further objects and advantages of the invention will become apparent as the following description proceeds and features of novelty which characterize the invention will be pointed out in particularity in the claims annexed to and forming a part of this specification.

For a better understanding of the invention, reference may be had to the following detailed description taken in connection with the accompanying drawings, in which:

FIGURES 1A, 1B and 1C illustrate parts of a magnetic core structure illustrating an embodiment of the invention;

FIGS. 2A, 2B and 2C illustrate the various joints of a magnetic core constructed according to the embodiment of the invention shown in FIGS. 1A, 1B and 1C;

FIGS. 3A and 3B illustrate a method of cutting the laminations included in the magnetic core structure shown in FIGS. 1A, 1B and 1C;

FIGS. 4A, 4B, 4C and 4D illustrate parts of a magnetic core structure illustrating another embodiment of the invention;

FIGS. 5A, 5B and 5C illustrate the various joints of a magnetic core structure constructed according to the embodiment of the invention shown in FIGS. 4A, 4B, 4C and 4D;

FIGS. 6A and 6B illustrate a method of cutting the laminations included in the embodiment of the invention shown in FIGS. 4A–4D;

FIG. 7 is a graph comparing the true watts and apparent watts of transformers constructed according to the embodiments of the invention shown in FIGS. 1A–1C and FIGS. 4A–4D, with transformers constructed according to the teachings of the prior art;

FIG. 8 is a graph comparing the sound levels of transformers constructed according to the embodiments of the invention shown in FIGS. 1A–1C and FIGS. 4A–4D, with transformers constructed according to the teachings of the prior art;

FIGS. 9A, 9B and 9C illustrate parts of a magnetic core structure illustrating another embodiment of the invention;

FIGS. 10A, 10B and 10C illustrate the various joints of a magnetic core constructed according to the embodiment of the invention shown in FIGS. 9A–9C;

FIGS. 11A, 11B, 11C and 11D illustrate parts of a magnetic core structure illustrating another embodiment of the invention;

FIGS. 12A and 12B illustrate joints of a magnetic core structure constructed according to the embodiment of the invention shown in FIGS. 11A–11B, using a certain sequence of the parts of the magnetic core;

FIGS. 13A and 13B illustrate joints of a magnetic core structure constructed according to the embodiment of the invention shown in FIGS. 11A–11D using another sequence of the parts;

FIGS. 14A, 14B and 14C illustrate parts of a magnetic core structure constructed according to another embodiment of the invention;

FIG. 15 illustrates one of the joints formed in a magnetic core constructed according to the teachings of the invention shown in FIGS. 14A–14C;

FIG. 16 illustrates one of the joints formed in a magnetic core structure construced according to a modification of the invention shown in FIGS. 14A–14C;

Figure 17:
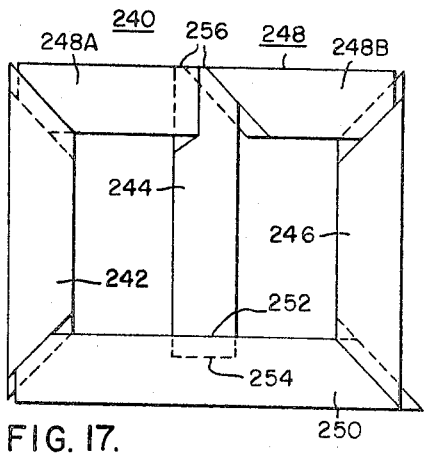
FIG. 17 illustrates a magnetic core structure constructed according to another embodiment of the invention.

Referring now to the drawings, and FIGS. 1A, 1B and 1C in particular, there is illustrated a transformer 20 which utilizes the principle of major joint distribution at the inner leg. Transformer 20 includes a magnetic core 22, and phase windings 24A, 24B and 24C, disposed in inductive relation with magnetic core 22, and shown in dotted outline. In general, magnetic core 22 includes a plurality of stacked layers of laminations formed from magnetic strip material having at least one preferred direction of magnetic orientation lengthwise of the material or substantially parallel with the sides of the material. The laminations which form the various layers included in the magnetic core structure 22 are assembled with their adjoining edges substantially aligned to form a substantially rectangular core having two rectangular windows or openings for receiving the phase windings 24A, 24B and 24C. Each layer of laminations included in magnetic core 22 includes three leg laminations, with yoke laminations connecting the ends of the leg laminations to form a rectangular core having rectangular openings or windows. All of the joints formed between the various yoke and leg laminations are distributed such that when the various layers of which the magnetic core 22 is formed are superposed, there are at least two laminations separating joints which lie in the same plane. Throughout the specification, when the term distributed joint or joints is used, it always describes a structure wherein at least two laminations bridge or separate repeating joints which lie in the same plane. This distinguishes a distributed joint from the butt-lap joint wherein only one lamination bridges or separates repeating joints which lie in the same plane.

If a low scrap magnetic core structure is to be provided, square joints must be utilized. It has been found that by keeping the number of square joints per layer of laminations to a minimum of two, and by utilizing all distributed joints, a magnetic core structure is provided which has substantially the same magnetic efficiency as cores of the prior art which utilize all diagonal butt-lap joints, and no square joints, but which have the disadvantage of producing scrap which amounts to at least 4% of the magnetic core weight.

More specifically, the magnetic core structure 22 includes one or more groups of layers of laminations, with each of the groups including at least three layers of laminations, such as layers 26, 28 and 30 shown in FIGS. 1A, 1B and 1C, respectively. The first layer 26 includes first and second outer leg laminations 32A and 36A, respectively, a center or inner leg lamination 34A, a first yoke portion which includes first and second laminations 38AA and 38AB, and a second yoke portion 40 which may be formed of a single lamination, or which may include first and second laminations 40AA and 40AB, as shown. The ends of the first and second outer leg laminations 32A and 36A are cut diagonally or at an oblique angle, preferably at an angle of substantially 45° with respect to the direction of magnetic orientation of the strip material from which the laminations are cut. One end of the inner leg lamination 34A is cut at a diagonal or at an angle of substantially 45° with respect to the direction of magnetic orientation, and one end is cut at right angles to the edges of the laminations or substantially perpendicular to the direction of magnetic orientation. The ends of the yoke laminations 38AB, 40AA, and 40AB are each cut diagonally with respect to the direction of magnetic orientation, and yoke lamination 38AA has one end cut diagonally and one end cut square or perpendicular with respect to the direction of magnetic orientation. In the assembly of layer 26, the various yoke and leg laminations are assembled to form a rectangular configuration having two substantially rectangular openings or windows, with the leg laminations 32A, 34A and 36A being disposed in spaced parallel relation, and the yoke laminations joining the leg laminations to complete the rectangular configuration. It will be noted that the yoke and leg laminations are all cut to be substantially aligned with matching cuts on the adjoining laminations, with the square cut on inner leg lamination 34A being disposed against yoke member 40, such as against yoke lamination 40AA, and the square cut on yoke lamination 38AA being disposed against inner leg lamination 34A. Thus, in layer 26 there are two square joints, with a square joint 42 appearing between inner leg lamination 34A and yoke lamination 38AA, and a square joint 44 appearing between inner leg lamination 34A and yoke lamination 40AA.

The next layer 28 of laminations, shown in FIG. 1B, includes first and second outer leg laminations 32B and 36B, respectively, and inner leg lamination 34B, a first yoke portion 38 which may be formed of a single lamination, or which may include first and second laminations 38BA and 38BB, respectively, as shown, and a second yoke portion which includes laminations 40BA and 40BB. The ends of the first and second outer leg laminations 32B and 36B, and the ends of yoke laminations 38BA, 38BB, and 40BA, are all cut diagonally with respect to the direction of magnetic orientation, preferably at an angle of 45° with respect to the sides of the lamination, while inner leg lamination 34B and yoke lamination 40BB each have one end cut square and one end cut diagonally with respect to the direction of magnetic orientation. The various yoke and leg laminations of layer 28 are assembled to form a substantially rectangular configuration in which the adjoining cuts are all substantially aligned, with two square joints, 46 and 48, appearing between yoke lamination 38BB and inner leg lamination 34B, and yoke lamination 40BB and inner leg lamination 34B, respectively.

The final layer 30 of laminations is shown in FIG. 1C, and it includes first and second outer leg laminations 32C and 36C, respectively, inner leg lamination 34C, a first yoke portion which includes first and second laminations 38CA and 38CB, respectively, and a second yoke portion which includes first and second yoke laminations 40CA and 40CB, respectively. The first and second outer leg laminations 32C and 36C, respectively, the inner leg lamination 34C, and yoke laminations 38CA and 40CB, all have their ends cut diagonally with respect to the sides of the laminations, or with respect to the direction of magnetic orientation. Yoke laminations 38CB and 40CA each have one end cut square and one end cut diagonally with respect to the sides of the laminations. The various yoke and leg laminations of layer 30 are assembled to form a rectangular configuration having two substantially rectangular windows, with a first square joint 50 being formed between yoke lamination 38CB and inner leg lamination 34C, and a second square joint 52 being formed between yoke lamination 40CA and inner leg lamination 34C. It should be noted that inner leg lamination 34C is in the shape of a parallelogram, which is important from the standpoint of automatically cutting and assembling the core 22, as will be hereinafter described.

In the assembly of the magnetic core structure 20, the layers 26, 28 and 30 of laminations are superposed or stacked in aligned relation to form a group of laminations, with as many such groups being utilized as necessary to provide the desired amount of magnetic material in the core.

When the layers 26, 28 and 30 are assembled and stacked to form a group, and the desired number of similar groups are superposed to form a magnetic core 22, all of the joints formed between the various yoke and leg laminations are distributed, with at least two laminations separating repeating joints in the same plane. It should be noted that the joints at the inner leg are distributed to form a major distribution of the joints. Each group of laminations includes five major joints at each end of the inner leg. FIGS. 2A, 2B and 2C illustrate the joints formed at the outer corners, the diagonal joints at the inside leg, and the square joint at the inside leg, respectively, with the laminations being shown separated slightly to more clearly demonstrate the joints. The joints at the outer corners of the magnetic core 22, as shown in FIG. 2A form a stepped pattern having three steps, and then the pattern is repeated in the next group. A plane disposed through any of the repeating joints, such as the plane illustrated by line 54 through the first step of the joint, illustrates that at least two laminations separate the joint before it is repeated. The same is true for the diagonal and square joints at the inside leg, as shown in FIGS. 2B and 2C.

It should be noted that none of the ends of the laminations have two diagonal cuts, thus eliminating or substantially reducing the amount of scrap produced during the forming of the laminations. The ends of certain of the yoke laminations are shown in FIGS. 1A–1C as being clipped flush with the sides of the outer legs. This is not necessary, however, as all of the projecting ends extend outward on the leg sides of the core, and thus would not interfere with the placement of the core end frames, which are disposed on the yoke sides of the core. If the magnetic core is stacked manually, the clipped ends aid in stacking the core. The yoke portions having clipped ends may be stacked with the clipped ends against a plane surface, which automatically assembles the laminations to have the desired displacement between the ends of the laminations to form the distributed joints. If the magnetic core is stacked automatically, the ends may be left unclipped, thus eliminating the clipping operation.

In addition to providing a substantially scrapless magnetic core structure, magnetic core structure 22 lends itself to semi-automatic production, with the laminations being automatically cut from a strip of magnetic material, such as with an oscillating shear, with all of the legs and lower yoke laminations being cut in the same layer sequence as they appear in the core. The upper yoke laminations are necessarily stored, as they are assembled after the various phase windings are disposed on the leg portions of the core. In other words the trailing edge of each leg and lower yoke lamination is aligned with the leading edge of the lamination which follows it in the construction of the core, FIGS. 3A and 3B illustrate strips of magnetic material, with the sequence of cutting the various leg and yoke laminations being illustrated. FIG. 3A illustrates the leg lamination punching or cutting cycle, with the first and second laminations being the first and second outer leg laminations 32A and 36A, respectively, of layer 26, and the third lamination being the inner leg lamination 34A of layer 26. The next three laminations are the inner and first and second outer leg laminations, 34B, 32B and 36B, respectively, of layer 28, and the final three laminations are the first outer, inner and second outer leg laminations, 32C, 34C and 36C, respectively, of layer 30. The same cycle is then repeated.

FIG. 3B illustrates the yoke lamination punching or cutting cycle. The first two laminations are the lower yoke laminations 40AA and 40AB for layer 26, the next lamination is the top yoke lamination 38AA for layer 26, which is automatically stored. The laminations to be stored are designated in FIG. 3B by underlining the reference numeral referring to the lamination. The next lamination is lamination 40BB for the lower yoke of the second layer 28. The next lamination is 38CB, and it is stored since it is part of the upper yoke of the first layer 26. The next lamination is 40BA, which is for the lower yoke of the second layer. The next two laminations, 38BA and 38BB, are for the upper yoke of the second layer, and are stored. The next lamination, 40CA, is for the lower yoke of the third layer. The next lamination, 38CB, is stored, since it is for the upper yoke of the third layer. The next lamination 40CB, is for the bottom yoke of the third layer, and the last lamination of the cycle, 38CA, is stored, since it is part of the top yoke of the third layer. Thus, all of the lower yoke laminations are cut in their proper layer sequence, and all of the upper or top yoke laminations are cut in their proper layer sequence. When using three layers of laminations in a substantially scrapless magnetic core, to obtain all distributed major joints, wherein at least one end of each inner leg has a diagonal cut, the parallelogram shape of inner leg lamination 34C is essential in order to get the bottom yokes to appear in the proper layer sequence, and for the top yokes to appear in their proper layer sequence.

It should be noted that although 12 yoke laminations are utilized for the three layers of each group, that only four different yoke lamination shapes are required; i.e., laminations 38AA and 40BB are the same, laminations 38AB, 40AB, 38BA, 40BA, 38CA and 40CB are the same, laminations 40AA and 38BB are the same, and laminations 38CB and 40CA are the same. Further, only two different leg lamination sizes are required.

The various yoke laminations illustrated in FIGS. 1A, 1B and 1C are shown wider than the leg laminations, but the same teachings of the invention apply equally to magnetic cores having widened or unwidened yokes.

To illustrate the greatly improved performance of magnetic cores constructed according to the teachings of FIGS. 1A, 1B and 1C, transformers constructed according to these teachings were compared with transformers having substantially scrapless magnetic cores which also have two square joints per layer, but which have all butt-lap type joints. In other words, all of the joints have one lamination between them before they repeat in the same plane. The joints at the outer corners were butt-lap joints, such as shown in U.S. Patent No. 2,300,964, hereinbefore referred to, and the joints at the inner leg were butt-lap joints formed by utilizing lamination 34C of FIG. 1C, and reversing or flipping alternate laminations. This provides the two square joints per layer and thus gives a direct comparison of the substantial improvement in performance by introducing distributed major joints. The transformers constructed according to the teachings of FIGS. 1A–1C and the transformers having all butt-lap joints were tested for true watt loss (TW), apparent watts loss (AW) and for sound level, at different levels of induction, with the results shown graphically in FIGS. 7 and 8. Solid curve 60 of FIG. 7 compares the differences in true watt (TW) iron losses between the embodiment of FIGS. 1A–1C and a transformer having a butt-lap core, in percent of the losses of the butt-lap core. The difference in percent is plotted on the ordinate, against the percent volts or core leg induction in kilogausses on the abscissa. It will be noted that transformers constructed according to the embodiment of FIGS. 1A–1C show an improvement in TW iron losses which varies between 5.5 and 8%, with the improvement being approximately 6% at 100% volts.

Solid curve 62 of FIG. 7 compares the difference in apparent watts per pound (AW) in percent of the losses of the transformers having the butt-lap cores, with the transformers constructed according to the embodiment of FIGS. 1A–1C showing an improvement which varies from 20 to 38%, with the improvement being in excess of 30% at 100% volts.

FIG. 8 illustrates the improvement in the sound level of transformers constructed according to the embodiment of FIGS. 1A–1C compared with transformers utilizing butt-lap cores, with the dot-dash curve 64 being the sound level curve for the butt-lap transformers, and the solid curve 66 being the sound level curve for the transformers constructed according to the FIG. 1A–1C embodiment. The improvement in sound level varies with induction, between a reduction of 4 and 0.6 db flat, in the practical range of 13 to 18 kilogausses leg flux density.

The substantial improvement in performance of a transformer utilizing a core as taught by FIGS. 1A–1C over a transformer having a butt-lap core, enables a magnetic core constructed according to the teachings of FIGS. 1A–1C to be worked at higher levels of induction, or a core constructed according to the teachings of the invention may be constructed with less magnetic material, and still produce the same magnetic performance as transformers with butt-lap cores.

The teachings of FIGS. 1A–1C may be extended to a substantially scrapless magnetic core having distributed major joints, with one or more of the major joints being stepped, two square joints per layer, and a minimum of three laminations between repeating joints in the same plane, as shown in FIG. 4. Fig. 4A illustrates a transformer 70 which includes a magnetic core 72, and phase windings 74A, 74B and 74C, shown in dotted outline. Like magnetic core 22 shown in FIG. 1A, magnetic core 72 is a substantially scrapless core having two square joints per layer, and distributed major joints, with one of the major joints being stepped. It should be understood that although FIG. 4A illustrates only one major joint being stepped, that any number of the major joints could be stepped. Instead of being a three layer core having at least two laminations between repeating joints, like magnetic core 22, magnetic core 72 is a four-layer core having at least three laminations disposed between repeating joints in the same plane, with the additional layer being obtained by stepping a major joint. In general, magnetic core 72 includes a plurality of stacked layers of laminations formed from magnetic strip material having at least one preferred direction of magnetic orientation lengthwise of said material or substantially parallel with the sides of the material. The laminations which form the various layers included in magnetic core 72 are assembled with their adjoining edges substantially aligned to form a rectangular core having two rectangular windows or openings for receiving phase windings 74A, 74B and 74C. Each layer of laminations included in magnetic core 72 includes three leg laminations, with yoke laminations connecting the ends of the leg laminations to form the rectangular configuration. All of the joints formed between the various leg and yoke laminations are distributed such that when the various layers of which the magnetic core 72 is formed are superposed or stacked in contacting aligned relation, there are at least three laminations separating joints which lie in the same plane.

More specifically, the magnetic core 22 includes one or groups of layers of laminations, with each of the groups including at least four layers of laminations, such as layers 76, 78, 80 and 82 shown in FIGS. 4A, 4B, 4C and 4D, respectively. The first layer 76 includes first and second outer leg laminations 84A and 88A, respectively, an inner leg lamination 86A, a first or upper yoke portion which includes laminations 90AA and 90AB, and a second or lower yoke portion which may be formed of a single lamination, or which may include laminations 92AA and 92AB, as shown. The ends of the first and second outer leg laminations 84A and 88A, and yoke laminations 90AA, 92AA and 92AB are all cut diagonally or at an oblique angle, preferably at an angle of substantially 45° with respect to the direction of magnetic orientation of the strip material from which the laminations are cut. The inner leg lamination 86A and yoke lamination 90AB each have one end cut diagonally with respect to the direction of magnetic orientation, and one end cut square or perpendicular to the direction of magnetic orientation.

In the assembly of layer 76, the leg laminations are disposed in spaced, parallel relation, with the various yoke laminations connecting the ends of the leg laminations to form a substantially rectangular configuration having two rectangular openings. It will be noted that two square joints are formed in layer 76, with one square joint 94 being formed between the inner leg lamination 86A and yoke lamination 90AB, and another square joint 96 being formed between inner leg lamination 86A and yoke lamination 92AB. The second layer 78 of laminations, shown in FIG. 4B, includes first and second outer leg laminations 84B and 88B, respectively, and inner leg lamination 86B, a first or upper yoke portion which includes laminations 90BA and 90BB, and a second or lower yoke portion which includes laminations 92BA and 92BB. Layer 78 is assembled as described for layer 76, with layer 78 having a square joint 98 appearing between inner leg lamination 86B and yoke lamination 90BB, and a square joint 100 appearing between inner leg lamination 86B and yoke lamination 92BB. It should be noted that in layer 78, upper yoke lamination 90BB is narrower than the other yoke laminations for purposes which will be hereinafter described.

The third layer 80 of laminations, shown in FIG. 4C, includes first and second outer leg laminations 84C and 88C, respectively, an inner leg lamination 86C, an upper yoke portion which includes laminations 90CA and 90CB, and a lower yoke portion which includes laminations 92CA and 92CB. When layer 80 is assembled as described for layer 76, layer 80 has a square joint 102 appearing between inner leg lamination 86C and upper yoke lamination 90CA, and a square joint 104 appearing between inner leg lamination 86C and lower yoke lamination 92CA. Layer 80 has a bottom yoke lamination 92CA which is narrower than the other yoke laminations, for purposes which will be hereinafter described.

The fourth layer 82 of laminations, shown in FIG. 4D, includes first and second outer leg laminations 84D and 88D, respectively, an inner leg lamination 86D, an upper yoke portion which may be formed of a single lamination, or which may include laminations 90DA and 90DB, as shown, and a lower yoke portion which includes laminations 92DA and 92DB. Layer 82, when assembled, also has two square joints, with a square joint 106 appearing between inner leg lamination 86D and upper yoke lamination 90DA, and a square joint 108 appearing between inner leg lamination 86D and lower yoke lamination 92DA.

In the assembly of magnetic core structure 72, the layers 76, 78, 80 and 82 of laminations are stacked in aligned relation to form a group, with as many similar groups being utilized as necessary to provide the desired amount of magnetic material in the core. When the layers 76, 78, 80 and 82 are assembled and stacked to form a group, and the desired number of similar groups are stacked to form magnetic core 72, all of the joints formed between the various leg and yoke laminations are distributed, with at least three laminations separating repeating joints in the same plane. In other words, each of the joints formed in one layer are offset from the joints in all of the other layers. By utilizing two yoke laminations, such as laminations 90BB and 92CA, in layers 78 and 80, respectively, which are narrower than the remaining yoke laminations, all of the square joints are offset from one another in the core, without resorting to inner leg laminations which have both ends cut diagonally. Each of the inner leg laminations have one end cut square, and the narrow yoke laminations 90BB and 92CA provide the necessary offset between the square joints formed by the square ends of the inner leg laminations. Thus, the narrow yoke laminations form joints 98 and 104 which are stepped from 106 and 96, respectively. The magnetic core 72 has the five major joints of the magnetic core shown in FIGS. 1B–1C, plus an additional joint obtained by stepping one of the major joints. If yoke widening is utilized, as shown in FIGS. 4A–4D, wherein the yoke laminations are cut from a strip of magnetic material wider than the leg laminations to produce a magnetic core structure which has more magnetic material without affecting the size of the phase windings, the narrower yoke laminations may be made the same width as the leg laminations, and cut from the same magnetic strip material as the leg laminations. Thus, the narrower yoke laminations may be made the same ducing any scrap. If yoke widening is not utilized, the amount of scrap produced by the introduction of the narrower yoke laminations is still minute compared to the 4% scrape rate produced when inner legs are all cut into a V shape on each end.

FIGS. 5A, 5B and 5C illustrate the joints produced in each group of stacked layers, at the outer corners of the core, the diagonal joint at the inner leg, and the square joint at the inner leg, respectively. It will be noted that an imaginary plane disposed perpendicular to the laminations, through each joint, cuts three laminations before the joint is repeated. For example, a plane represented by line 110 disposed through one of the joints in FIG. 5C, passes through three laminations before the joint is repeated.

None of the laminations have two diagonal cuts, thus eliminating or substantially reducing the amount of scrap produced during the cutting of the laminations. Although the ends of certain of the yoke laminations are shown in FIGS. 4A–4D as being clipped flush with the sides of the outer legs, this is not essential as all of the projecting ends extend outwardly on only the leg sides of the core where they would not interfere with the placement of the yoke end frames.

In addition to providing a substantially scrapless magnetic core structure, the magnetic core structure 72 lends itself to semi-automatic production, with the bottom yoke laminations being cut in layer sequence. Even though the narrow yoke laminations are cut from the same strip material as the leg laminations, they are still cut in layer sequence, as they are cut during the period the leg laminations for their respective layers are cut. FIGS. 6A and 6B illustrate strips of magnetic material, with the sequence of cutting the various leg and yoke laminations being illustrated. FIG. 6A illustrates the leg laminations and narrow yoke laminations cutting cycle, with the first three laminations, 88A, 84A and 86A, being the leg laminations for layer 76, the next four laminations 86B, 90BB, 84B and 88B being the leg and narrow yoke laminations for layers 78, the next four laminations 84C, 88C, 92CA and 86C being the leg and narrow yoke laminations for layer 80, and the final three laminations 86D, 88D and 84D being the leg laminations for layer 82. The reference numerals for the narrow yoke laminations 90BB and 92CA are underlined to distinguish them from the leg laminations.

FIG. 6B illustrates the yoke lamination punching cycle, with the reference numerals for the upper yoke laminations being underlined to indicate that they are stored until the upper yoke is assembled followed the placement of the various phase windings. The bottom yoke laminations are cut in layer sequence, with the first and third laminations 92AB and 92AA being the bottom yoke laminations for layer 76, the fifth and seventh laminations 92BA and 92BB being the bottom yoke laminations for layer 78, the ninth lamination 92CB being the wide yoke lamination for layer 80, and the twelfth and fourteenth laminations 92DA and 92DB being the bottom yoke laminations for layer 82. Since the leg laminations and yoke laminations for each layer would be cut at the same time with two adjacent cutting lines, the narrow lower yoke lamination 92CA would appear in the proper layer sequence for automatic stacking.

It should be noted that although sixteen yoke laminations are utilized in the four layers, that only four different lamination shapes are required, i.e., laminations 90AA, 92AA, 90BA, 92BA, 90CB, 92CB, 90DB and 92DB are the same, laminations 90AB, 92BB, 90CA and 92DA are the same, laminations 92AB and 90DA are the same, and laminations 90BB and 92CA are the same. Further, only three different leg lamination sizes are required.

Transformers utilizing magnetic cores constructed according to the embodiment of the invention shown in FIGS. 4A–4D were constructed tested for apparent watts loss (AW), true watts loss (TW), and sound level, as compared with a transformer constructed with low scrap magnetic cores having two square joints per layer, but having all butt-lap joints. The result of this comparison are shown in FIGS. 7 and 8. The difference in apparent watts loss/lb., in percent of the losses of the butt-lap transformer appear as dotted curve 114 in FIG. 7. It will be noted that the improvement in apparent watts loss varies with the leg induction from approximately 22% to 45%, with the improvement being the maximum at 100% voltage. It will also be noted that transformers constructed according to the embodiments of FIGS. 4A–4D also show an improvement in apparent watts loss over the transformers constructed according to the embodiment of FIGS. 1A–1C, especially at higher inductions.

The comparison in true watts (TW) loss appears as dotted curve 112 of FIG. 7, with the improvement varying with the leg induction from 5% to over 8%, with the improvement being approximately 7% at 100% volts. It will be noted that the embodiment of FIGS. 4A–4D shows substantially the same improvement over butt-lap cores as the embodiment of FIGS. 1A–1C, with the embodiment of FIGS. 4A–4D being slightly better than the embodiment of FIGS. 1A–1C at higher inductions.

FIG. 8 compares the sound level of a transformer constructed with three-lap distributed joint cores over single or butt-lap cores, with dotted curve 116 being the sound level curve for the three-lap cores and the dot-dash curve 64 being the sound level for the butt-lap cores. The reduction in sound level varies with the leg induction, being between 4 and 5.5 db flat. It will also be noted that the three lap cores of the embodiment of FIGS. 4A–4D has a lower sound level than two-lap cores of the embodiment of FIGS. 1A–1C, the latter sound level curve being the solid curve 66.

The substantial improvement in performance of transformers having three-lap cores over transformers having single or butt-lap cores enables the three-lap core to be worked at much higher levels of induction, or allows the three-lap core to be constructed with less iron, resulting in a substantial cost savings.

FIG. 9A illustrates a transformer 120 constructed according to another embodiment of the invention. Transformer 120 includes the magnetic core structure 122, and phase windings 124A, 124B and 124C, shown in dotted outline. Magnetic core 122, like magnetic core 22 shown in FIG. 1A, is a three layer core having distributed major joints at the inner leg, at least two laminations disposed between repeating joints in the same plane, and has two square joints per layer, in order to construct a substantially scrapless magnetic core. The difference between magnetic core 122 and magnetic core 22 is in the shape of the inner leg laminations, with two of the inner leg laminations in magnetic core 122 having a diagonal cut on each end, and one of the inner leg laminations having square cuts on each end.

More specifically, magnetic core 122 includes layers 126, 128 and 130. Layer 126 includes first and second outer leg laminations 132A and 136A, respectively, an inner leg lamination 134A, an upper yoke portion which includes laminations 138AA and 138AB, and a lower yoke portion includes laminations 140AA and 140AB. It should be noted that one end of inner leg lamination 134A extends completely through the lower yoke portion, appearing at the outer surface of the lower yoke portion, and the other end of inner leg lamination 134A extends only partially across the upper yoke portion.

The next layer 128 includes first and second outer leg laminations 132B and 136B, respectively, an inner leg lamination 134B, an upper yoke portion which includes laminations 138BA and 138BB, and a lower yoke portion which includes laminations 140BA and 140BB. It should be noted that in layer 128 that the inner leg lamination 134B is rotated 180° on an axis which is parallel with the longitudinal direction of the strip, and also that one end of the lamination extends completely through the upper yoke portion, appearing at the outer surface of the upper yoke portion, and the remaining end of the inner leg lamination 134B extends only partially across the lower yoke portion.

The third layer 130 of laminations includes first and second outer leg laminations 132C and 136C, respectively, an inner leg lamination 134C, an upper yoke portion which may be formed of a single lamination, or which may include laminations 138CA and 138CB, as shown, and a lower yoke portion which may be formed of a single lamination or which may include laminations 140CA and 140CB, as shown. It should be noted that the inner leg lamination 134C has each end cut square or perpendicular to the sides of the laminations, and has its ends butted against the inner sides of the upper and lower yoke portions.

In the assembly of magnetic core 122, layers 126, 128 and 130 are superposed or stacked one upon the other, with as many similar layers being utilized as necessary to obtain the desired amount of magnetic material in the core. It will be noted that when layers 126, 128 and 130 are superposed, that all of the joints appearing at the outer corners of the core are offset from one another, and all of the joints appearing above and below the inner leg portion are distributed or offset to form a major joint distribution. With this arrangement, at least two laminations are disposed between repeating joints. This is illustrated by the joint formations shown in FIGS. 10A, 10B and 10C, which illustrate the joints at the outer corners of the core, the diagonal joints at the inner leg, and the perpendicular joint at the inner leg, respectively. It will be noted that by passing a plane, represented by a line 142 through one of the joints in FIG. 10A, that two laminations are disposed between the repeating joints.

It should be noted that although twelve yoke laminations are required in the three layers which make up a group of laminations, that only three different sizes of yoke laminations are required. It should further be noted that only two different sizes of leg laminations are required.

In FIGS. 9A, 9B and 9C, the various yoke laminations are illustrated as being wider than the leg laminations. However, the teachings of the invention apply equally to magnetic cores having widened or unwidened yoke laminations. It will further be noted that the ends of the yoke laminations are clipped so that they do not extend beyond the outer leg portions of the core. This is not essential, however, as all of the ends of the laminations that would extend beyond the core, do so only on the leg sides of the core and would not interfere with the yoke end frames.

FIG. 11A illustrates a transformer 150 constructed according to another embodiment of the invention, which has a substantially scrapless, four layer, three-lap distributed joint core, having two square joints per layer, a single inner leg lamination size, a single outer leg lamination size, and only two different yoke lamination sizes. The core in transformer 150 combines a major joint distribution with certain of the major joints being stepped. Transformer 150 includes a magnetic core 152 and phase windings 154A, 154B, 154C, with the phase windings shown in dotted outline. Magnetic core 152 is similar in some respects to magnetic core 72 shown in FIG. 4A, both being four layer, three-lap cores, but all of the yoke laminations in magnetic core 152 are the same width, and magnetic core 152 requires fewer lamination shapes than magnetic core 72.

More specifically, magnetic core 152 includes one or more groups of layers of laminations cut from a strip of magnetic material having at least one preferred direction of magnetic orientation lengthwise of the material or parallel with the sides of the material, with each group including four layers of laminations, such as layers 166, 168, 170 and 172 shown in FIGS. 11A, 11B, 11C, and 11D, respectively. The first layer 166 includes first and second outer leg laminations 156A and 160A, respectively, and inner leg laminations 158A, a first or upper yoke portion including laminations 162AA and 162AB, and a second or lower yoke portion including laminations 164AA and 164AB. The various leg laminations are spaced in parallel relation, with the various yoke laminations connecting the ends of the leg laminations to form a substantially rectangular configuration having two openings. It will be noted that layer 166 has two square joints per layer, with a square joint 174 being formed between the inner leg lamination 158A and upper yoke lamination 162AB, and a square joint 176 being formed between the inner leg lamination 168A and lower yoke lamination 164AB.

The next layer 168 includes first and second outer leg laminations 156B and 160B, an inner leg lamination 158B, upper yoke laminations 162BA and 162BB, and lower yoke laminations 164BA and 164BB. Layer 168 includes a square joint 178 formed between upper yoke lamination 162BA and inner leg lamination 158B, and a square joint 180 formed between inner leg lamination 158B and lower yoke lamination 164BA.

Layer 170 includes first and second outer leg laminations 156C and 160C, an inner leg lamination 158C, upper yoke laminations 162CA and 162CB, and lower yoke laminations 164CA and 164CB. Layer 170 also has two square joints, with a square joint 182 being formed between inner leg lamination 158C and upper yoke lamination 162CA, and a square joint 184 being formed between inner leg lamination 158C and lower yoke lamination 164CA.

Layer 172 includes first and second outer leg laminations 156D and 160D, respectively, an inner leg lamination 158D, upper yoke laminations 162DA and 162DB, and lower yoke laminations 164DA and 164DB. Layer 172 has a square joint 186 appearing between inner leg lamination 168D and upper yoke lamination 162DB, and a square joint 188 appearing between inner leg lamination 158D and lower yoke lamination 164DB.

The inner leg laminations all have a similar shape, with each end being cut diagonally, and one end having an additional cut which forms a step which narrows the width of the lamination for a predetermined distance from one end. In layers 166 and 170, the end of the inner leg lamination having the step is disposed at the lower yoke portion, and the lamination of one of the layers is rotated 180° about a longitudinal axis with respect to the center leg lamination of the other layer, in order to distribute the joints. Layers 168 and 172 have the end of the lamination having the step disposed in the upper yoke portion, and one of the laminations is rotated 180° about a longitudinal axis with respect to the other lamination in order to provide offset or distributed joints. It will also be noted that inner leg laminations 158A and 158C have their ends disposed along common planes intermediate the width of the yoke portions, and that inner leg laminations 158B and 158D have their ends disposed along common planes, which common planes are different from the common planes of the inner leg portions 158A and 158C, in order to further distribute the joints by stepping certain major joints. Although all of the ends of the inner leg laminations are illustrated as falling intermediate the width of the yoke laminations, the same joint pattern may be obtained by disposing either all of the ends having the single cut against the outer surface of the yoke portions, or disposing all of the ends having two cuts against the outer surface of the yoke portions, and lengthening the inner leg laminations such that their opposite ends will fall intermediate the width of the opposite yoke portion. The important feature is to provide inner leg laminations having a length which will not reach from the outer surface of one yoke to the outer surface of the other yoke, and disposing like cut ends on the same planes, which planes for the two types of cut ends are offset from one another. The joints formed at the outer corners of magnetic core 162 are all diagonal, and they are all offset from one another such that when the layers 166, 168, 170 and 172 are superposed one upon the other that none of the joints will be in alignment with any of the other joints. FIGS. 12A and 12B illustrate the joint formation at the outer corners and at the center leg respectively, when the layers are stacked in the sequence 166, 168, 170 and 172. A plane represented by line 190 passed perpendicularly through the laminations and through one of the joints, illustrates that each joint is separated by three laminations before it repeats. FIGS. 13A and 13B illustrate the joint formation at the outer corners and at the center leg, respectively, when the layers are stacked in the sequence 166, 168, 172 and 170.

FIGS. 11A through 11D illustrate a magnetic core having a wide yoke, however, the principles of the embodiment also apply to the magnetic core wherein the yoke portions are the same width as the leg portions. Further the portions of the yoke laminations which would extend beyond the sides of the leg laminations are illustrated as being clipped, which is not essential, however, since all of the projections occur on the leg sides of the core and would not interfere with end frames disposed on the yoke sides of the core.

As hereinbefore described, only two different sizes of yoke laminations are required, and only two different sizes of leg laminations are required. Further, the magnetic core 152 may be made in a substantially scrapless manner, with the only scrap being the cutout or step portion of one end of the inner leg laminations, and also the clipped ends, if the ends of the yoke laminations which extend beyond the leg members are clipped.

Although the inner leg laminations are illustrated in the figures as being a substantially trapezoidal shape, the teachings of the invention would apply equally to an inner leg lamination having a parallelogram shape.

FIG. 14A illustrates a magnetic core 200 constructed according to another embodiment of the invention with the joint distribution at the inner leg being entirely of the stepped type. In general, magnetic core 200 is a substantially scrapless core having one or more groups of laminations, with at least three layers of laminations per group, such as layers 202, 204, and 206 shown in FIGS. 14A, 14B, and 14C, respectively. Each layer of laminations has two square joints, and all of the joints are distributed in a stepped manner to provide at least two laminations between repeating joints in the same plane. Magnetic core 200 is constructed of a plurality of laminations cut from a strip of magnetic material having at least one preferred direction of magnetic orientation parallel with the sides of the material. Each layer of laminations includes first and second outer leg laminations, an inner leg lamination, and yoke laminations which connect the ends of the leg laminations to form a substantially rectangular magnetic core having two openings or windows for receiving electrical windings (not shown).

More specifically, layer 202 includes first and second outer leg laminations 210A and 214A, inner leg lamination 212A, a first or upper yoke portion, which may include laminations 216AA and 216AB, and a second or lower yoke portion, which may include laminations 218AA and 218AB. Leg laminations 210A, 212A and 214A are disposed in spaced parallel relation, with the yoke laminations disposed to complete the rectangular configuration, with the ends of the yoke laminations being aligned with matching cuts on the ends of the leg laminations. The leg laminations 210A, 212A and 214A and yoke laminations 216AB and 218AA each have their ends cut diagonally, preferably at an angle of 45° with respect to the sides of the laminations, and yoke laminations 216AA and 218AB each have one end cut diagonally and one end cut square or perpendicular to the sides of the laminations. When assembled, the laminations have two square joints per layer, with a square joint 220 appearing between inner leg lamination 212A and yoke lamination 216AA, and a square joint 222 appearing between inner leg lamination 212A and yoke lamination 218AB.

Layer 204 includes first and second outer leg laminations 210B and 214B, an inner leg lamination 212B, an upper yoke portion which may include laminations 216DA and 216DB, and a lower yoke portion which may include laminations 218BA and 218BB. When the various leg and yoke laminations of layer 204 are assembled, a square joint 224 is created between upper yoke lamination 216BA and inner leg lamination 212B, and a square joint 226 is created between inner leg lamination 212B and lower yoke lamination 218BB.

Layer 206 includes first and second outer leg laminations 210C and 214C, an inner leg lamination 212C, an upper yoke portion which may include laminations 216CA and 216CB, and a lower yoke portion which may include laminations 218CA and 218CB. When assembled to form layer 206, the various laminations form a square joint 228 between inner leg lamination 212C and upper yoke lamination 216CA, and a square joint 230 between inner leg lamination 212C and lower yoke lamination 218CB.

It should be noted that the inner leg lamination 212B of layer 204 has a cut adjacent each end which removes a small section of lamination adjacent the sides of the lamination to offset the square joints 224 and 226 slightly from the square joints 220 and 222 of the preceding layer. The cut is performed by cutting the inner leg parallel with the length of the strip for the width of each yoke, and substantially perpendicular to the strip by the amount of the desired offset between the joints. The offset is greatly exaggerated in the figures for clarity. The actual offset may be as small as 1% of the lamination width, and still produce the benefits derived from distributing the joints. The inner leg lamination 212B should be cut such that after the incremental cuts are disposed on each end, that the lamination will still extend from the outer surface of the upper yoke portion to the outer surface of the lower yoke portion. In layer 206, the inner leg lamination 212C is incrementally cut near each of its ends for a slightly greater distance perpendicular to the sides of the strips than the incremental cuts on lamination 212B, in order to offset the square joints 228 and 230 from the square joints 224 and 226, respectively, of layer 204. Again, it will be noted that inner leg lamination 212C extends to the outer surface of both the upper and lower yoke portions.

The various layers shown in FIGS. 14A–14C are stacked in contacting aligned relation, to form a group, and as many groups may be assembled as necessary to provide the desired amount of magnetic core material. Also, each group may have more than three layers if desired, with the joints also being offset by the incremental cuttings hereinbefore described. A larger number of laminations per group tends to improve the performance of the core.

In the assembly of the magnetic core 200, since the inner legs are all the same length, it is only necessary to stack the laminations with one end against the flat surface and square up the sides of the laminations, to automatically form a stepped distributed joint at each end. Also, if the ends of the yoke laminations are clipped flush with the sides of the magnetic core 200 as shown, the clipped ends may also be stacked against a plane or flat surface, to automatically obtain the desired distributed joint at the corners of the core. It is not necessary, however, to clip the ends of the yoke laminations which extend past the leg sides of the core, as they all extend outwardly in a manner which would not interfere with the placement of the end frames.

Magnetic core 200 only requires two sizes of yoke laminations, such as the lamination size of lamination 216AB, and the lamination size of the lamination 216AA. If the yokes are clipped so that they do not extend beyond the core sides, more sizes would be created, however. Only one size of the outer leg lamination is required as it is moved vertically a small increment from layer to layer, and the matching yoke laminations are moved horizontally to match the cut on the ends of the outer leg laminations. The inner leg lamination requires as many different sizes of laminations as there are distributed joints if the inner leg laminations are all stacked one way. Additional distributed joints may be created at the inner leg, however, by flipping the laminations 180° with respect to their longitudinal axis, in alternate groups, which, provides a plurality of stepped major joints, as opposed to merely providing stepped joints. For example, FIG. 15 shows the joint pattern of four groups of laminations above the inner leg, with all of the groups stacked the same way. FIG. 16 shows the joint pattern of the four groups of FIG. 15, but with the inner leg laminations of alternate groups flipped or rotated 180° about a longitudinal axis with respect to the laminations of the other groups thus generating, in effect, two groups of laminations with each group having six laminations. Without increasing the number of different sizes of laminations, the number of laminations separating repeating joints has been changed from two to five. Or, by utilizing the principle of rotating certain of the inner leg laminations 180° about their longitudinal axis, the number of incremental cuts, and thus the number of different lamination shapes may be reduced and still provide as many, or more, laminations between repeating joints as core structures which do not introduce additional major joint areas at the inner leg. This would not only provide the advantage of reducing the number of different lamination shapes, but would reduce the amount of scrap, and would widen the flux path at the inner leg.

Magnetic core 200 may be formed with about 1% scrap, compared with approximately 4% scrap in magnetic cores which use two diagonal cuts on each end of the inner leg lamination, thus even though magnetic core 200 has more scrap than some of the other embodiments of the invention hereinbefore described, it still presents a substantial savings in scrap. Further, magnetic core 200 lends itself to automatic cutting and semi-automatic stacking, as all of the laminations may be cut from a strip of magnetic material in layer sequence.

Although magnetic core 200 is shown and described with the inner leg laminations shaped in the form of a parallelogram, the same teachings also apply when the center leg is shaped in the form of a trapezoid. If the inner leg is shaped in the form of a trapezoid, the incremental cuts near the ends of the laminations would both be made on the side of the longer dimension. The principle of FIG. 16 may also be applied to inner leg laminations having a trapezoidal shape to obtain a stepped major distribution, if desired.

Although in FIG. 14A, the inner leg lamination is not shown with the ends cut to narrow the width of the lamination, as are the ends of the inner leg laminations of the remaining layers, it may be desirable to provide incremental cuts on the ends of all the inner leg laminations. This embodiment would be especially advantageous where the magnetic core is stacked with the laminations vertical, as the notch or incremental cut provides support for the matching yoke lamination. Further, the inner leg lamination in FIGS. 14A–14C are all illustrated with pointed ends. It will be understood that it may be more desirable to form the inner leg laminations such that the pointed ends are clipped, as are the ends shown in FIG. 17, in order to facilitate the alignment of the inner legs against a plane surface, without the danger of bending the points.

FIG. 17 illustrates a magnetic core 240, which is constructed of a plurality of groups of laminations, with each group having three or more layers. The joints in each group are offset from one another or distributed such that at least two laminations separate the joint before it repeats, with the joints at the inner leg utilizing the stepped principle. The dotted lines in FIG. 17 illustrate that the joints are distributed, with as many increments or steps being utilized between the solid and dotted lines as desired.

More specifically, magnetic core 240 includes first and second outer leg members 242 and 246, an inner leg member 244, an upper yoke member 248, which may include portions 248A and 248B, and a lower yoke member 250. The various leg and yoke members are constructed of a plurality of stacked laminations formed from magnetic strip material having at least one preferred direction of orientation in the direction of the strip or parallel with the sides of the material. Inner leg member 244 is formed of a plurality of laminations, each having one end cut diagonally with respect to the sides of the strip, and the other end cut square with respect to the sides of the strip. The distributed or stepped joints at the end cut diagonally are formed in the manner hereinbefore described relative to the magnetic core 200 shown in FIG. 14A, by incrementally cutting out portions near the end of the strip parallel with its sides, to incrementally narrow the width of the lamination. The distributed or stepped joints at the other end of the inner leg member 244 are formed by varying the length of the inner leg laminations in steps between the solid line 252 and the dotted line 254, and notching or cutting out the mating yoke lamination of yoke member 250, accordingly. Thus, the lower yoke member 250 may be constructed of stacked single laminations, which is usually desirable for the lower yoke. However, lower yoke member 250 may be constructed of more than one section if desired. Except for the small amount of scrap produced by the incremental cuts in yoke member 250 and in inner leg member 244, magnetic core 240 is substantially scrapless, and is suitable for automatically cutting the laminations from magnetic strip material and for semi-automatic stacking. The yokes may be clipped flush with the sides of the magnetic core 240, or they may extend outwardly from the leg sides of the core. The laminations which form the inner leg member 244 all extend to the outer surface of the upper yoke member 248, to aid in the stacking of the inner leg member 244, as the laminations may be assembled with the ends against a stop. The ends 256 of the laminations which form inner leg member 244 may be formed such that they are clipped as shown in FIG. 17, or pointed as shown in FIG. 14A. Alternate groups of inner leg laminations may be rotated 180° about their longitudinal axis, to provide a stepped major joint distribution without requiring additional inner leg lamination shapes.

Figure 18:
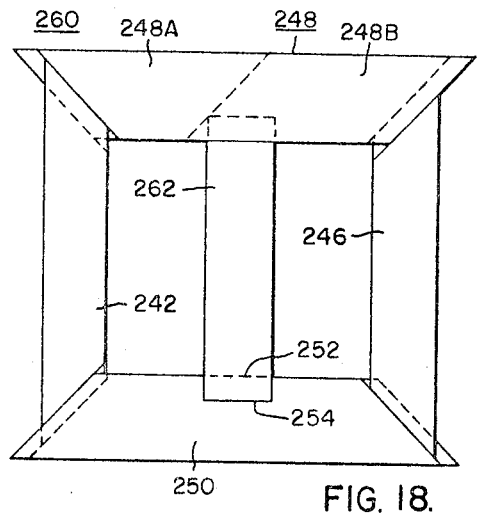
FIG. 18 illustrates a magnetic core structure constructed according to still another embodiment of the invention.

FIG. 18 illustrates a magnetic core structure 260, which is a modification of the embodiment of the invention shown in FIG. 17, and like reference numerals in FIGS. 17 and 18 indicate like components. In general, magnetic core 260 employs an inner leg member 262, which has square cuts on both ends, with the distributed joints being formed between the inner leg member 262 and the yoke members by moving the laminations which form inner leg member 262 vertically in steps, with incremental notches being cut in the adjoining yoke laminations to accommodate the inner leg laminations. Thus, magnetic core 260 utilizes the stepped joint principle at the inner leg. The construction shown in FIG. 18 simplifies the manufacture of the core, as all of the inner leg laminations which make up the inner leg member 262 are the same length. The distributed or stepped joints are formed by moving the laminations which form the various yoke members incrementally at right angles to the leg members, while the laminations which form the leg members are moved incrementally at right angles to the yoke members. The incremental steps occur between the solid and dotted lines, with as many steps being utilized as desired. However, at least three steps should be made in order to have at least two laminations between joints before they repeat. Except for the incremental cuts in the yoke members, the magnetic core 260 provides no scrap, and the laminations may be automatically cut and semi-automatically stacked. The ends of the yoke members which extend beyond the leg sides of the core may be left unclipped as shown, or they may be clipped if desired.

Figure 19:
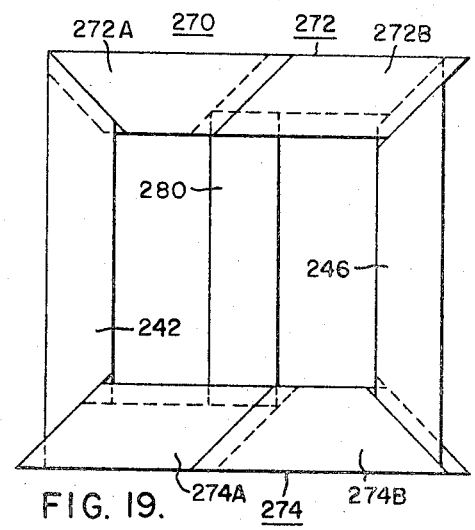
FIG. 19 illustrates a magnetic core structure constructed according to another embodiment of the invention.

FIG. 19 illustrates a magnetic core 270 which is a modification of the magnetic core 260 shown in FIG. 18, and also utilizes the stepped joint principle at the inner leg. Like reference numerals in FIGS. 18 and 19 indicate like components. Similar to the magnetic core 260, the center leg member 280 is constructed of laminations which have each end cut square or perpendicular to the sides of the laminations. However, instead of cutting the yoke laminations which adjoin the inner leg lamination to fit the ends of the inner leg, a portion of the upper and lower yoke members are made incrementally narrower to receive the incrementally changing inner leg laminations. More specifically, upper yoke portion 272 includes portions 272A and 272B. Portion 272A is similar to portion 248A of magnetic core 260. Portion 272B however, is constructed of laminations whose width narrows to receive the incrementally advancing laminations of the inner leg member 280. Unlike inner leg member 262 of magnetic core 260, the laminations of which inner leg member 280 are constructed change length, advancing or increasing in length to incrementally advance into the yoke portion, in order to obtain the desired distributed joints. Each group of laminations has at least three layers, to assure that repeating joints will be separated by at least two laminations.

Figure 20A:
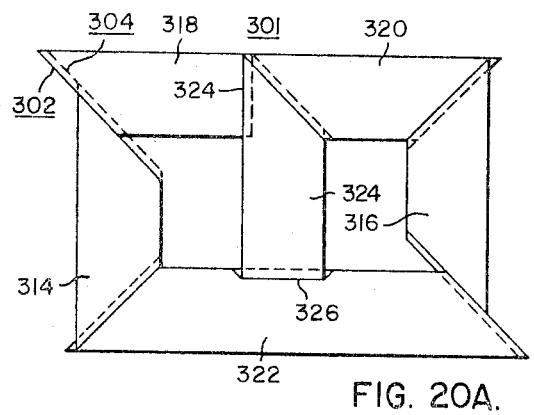
FIGS. 20A, 20B, and 20C illustrate magnetic core structure constructed according to another embodiment of the invention.
Figure 20B:
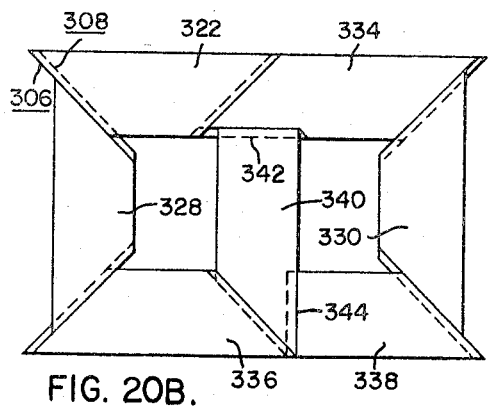
Figure 20C:
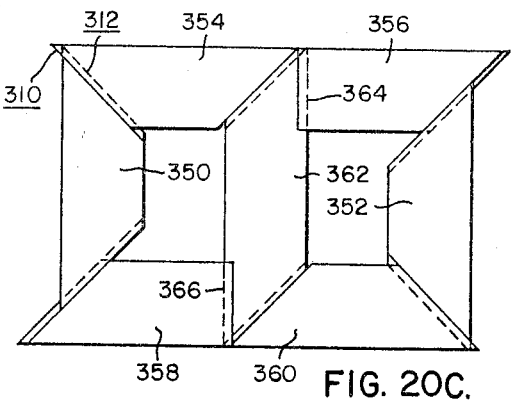

FIGS. 20A, 20B, and 20C illustrate layers of a magnetic core constructed according to another embodiment of the invention. As hereinbefore stated, FIGS. 1A–1C and 9A–9C illustrate magnetic core constructions wherein low scrap, efficient magnetic cores are produced by stepping the joints at the outer corners of the magnetic core and distributing the joints between the inner leg and yoke portions to form a plurality of distributed major joints. FIGURES 14A–14C, 17, 18 and 19, on the other hand, illustrate magnetic core constructions wherein low scrap, efficient magnetic cores and produced by stepping the joints at the outer corners of the magnetic core, and also stepping the joints between the inner leg and yoke portions. The major joint distribution of the first mentioned cores limits the number of different punching layers and the number of laminations disposed between repeated joints. In order to obtain a greater joint distribution at the inner leg, the last mentioned cores utilize the principle of selecting one of the major joints of the former cores and forming additional joints by varying this major joint area in a plurality of incremental steps. Since the number of steps is not limited, the number of different layers is not limited. However, the stepped major joint creates a butt joint with a small incremental gap, such as gap 300 shown in FIG. 14A, and this narrows the flux path through the inner leg by the dimension which is the sum of the plurality of incremental steps or gaps 300. In order to substantially decrease the reduction in the flux path at the inner leg, and at the same time reduce the amount of scrap still further, the principle of distributing the major joints may be combined with the principle of stepping the joints. This was mentioned briefly in reference to FIGS. 4A–4D, 11A–11D, 14A–14C and 16. FIG. 16 illustrates the advantageous "zig-zag" type of joint which is produced when the idea of combining major joint areas and stepped joints is applied to embodiment of the invention shown in FIGS. 14A–14C, which substantially increases the number of laminations disposed between repeating joints in the same plane. This idea of combining major joint distribution with stepped joint distribution of the major joints, may be applied to any of the embodiments of the invention to further improve the performance of the cores. FIGS. 20A–20C illustrate another practical embodiment of this principle.

FIGS. 20A, 20B and 20C each illustrate two layers of a magnetic core which has a plurality of stepped major joints. FIG. 20A illustrates layers 302 and 304 of a magnetic core 301, with the solid lines illustrating layer 302 and the dotted lines illustrating the location of the joints of layer 304. Layers 302 and 304 each include first and second outer leg laminations 314 and 316, an upper yoke portion which includes laminations 318 and 320, a lower yoke portion, which may include a single lamination 322, as shown, or which may be divided into two separate laminations and an inner leg lamination 324. Laminations 314, 316, 320 and 322 each have their ends cut diagonally with respect to the sides of the laminations, and laminations 318 and 324 each have one end cut diagonally and one end cut square with respect to the sides of the laminations, to form two square joints 324 and 326 per layer. In order to offset the joints between layers 302 and 304 at the outer corners of the core 301, the yoke laminations of one layer are shifted horizontally with respect to the yoke laminations in the other layer and the outer leg laminations of one layer, are shifted vertically with respect to the outer leg laminations in the other layer. In order to offset or step the joints formed above the inner leg laminations 324, one lamination is made longer than the other, producing an offset at square joint 326, and the diagonally cut end of one inner leg lamination is cut to narrow the lamination for a predetermined length. The same result could also be obtained by narrowing one of the complete inner leg laminations. In practice, both inner leg laminations for layers 302 and 304 may be cut to the same size, and when the inner leg lamination for layer 304 is incrementally cut to narrow the end of the lamination for a predetermined length, it will automatically shorten the lamination to form the offset between the ends of the laminations at joint 326.

Layers 306 and 308 shown in FIGURE 20B, each have first and second outer leg laminations 328 and 330 respectively, an upper yoke portion which may have laminations 332 and 334, or a single lamination, a lower yoke portion having laminations 336 and 338 and an inner leg lamination 340. The joints at the outer corners of layers 306 and 308 are produced in the same manner as the corner joints in layers 302 and 304, and, in addition to being offset from one another, the joints at the corners of layers 306 and 308 are also offset from the corner joints of layers 302 and 304. The inner leg laminations 340 of layers 306 and 308 are similar to the inner leg laminations 324 of layers 302 and 304, except they are in 180° rotational symmetry about an axis perpendicular to the plane of the lamination, with respect to their previous location, thus changing the locations of the major joints. In layers 306 and 308, the square joints appear at locations 342 and 344, and the joints are offset from one another in the same manner as described for the inner leg laminations 324 of layers 302 and 304.

Layers 310 and 312 shown in FIG. 20C, each have first and second outer leg laminations 350 and 352 respectively, an upper yoke portion having laminations 354 and 356, a lower yoke portion having laminations 358 and 360, and an inner leg lamination 362. The joints at the outer corners of layers 310 and 312 are produced in the same manner as the corner joints in layers 302 and 304, and, in addition to being offset from one another, the joints at the corners are offset from the corner joints of layers 302, 304, 306 and 308.

The inner leg laminations 362 of layers 310 and 312 have each end cut diagonally with respect to the sides of the laminations, with the diagonal cuts being substantially parallel with one another, in order to form a major joint area which will be substantially perpendicular to the major joint areas produced by inner leg laminations 324 and 340. If the inner leg laminations of layers 302 and 304 were in 180° rotational symmetry about a central axis which is perpendicular to the sides of the laminations and in the plane of the lamination, instead of inner leg lamination 362 being shaped like a parallelogram, it would be shaped like a trapezoid, in order to form major joint areas perpendicular to the major joint areas of the other layers. The ends of the inner leg laminations 362 are stepped or offset from one another by starting with the inner leg lamination for layer 310 being longer than the inner leg lamination for layer 312. Then the ends of the longer lamination are narrowed a predetermined increment, such that both inner leg laminations are the same length, both extending from the outer surface of the upper yoke portion to the outer surface of the lower yoke portion. This narrowing of the ends of one of the inner leg laminations steps or offsets the joints. The same result could also be produced by cutting one of the inner leg laminations from a narrower strip of magnetic material.

All of the layers of laminations shown in FIGS. 20A–20C are superposed or stacked together to form a group of laminations, with as many groups of laminations being utilized as necessary to obtain the desired core build. It should be noted that by combining the principles of distributing the major joints and of stepping the major joints, that five laminations separate repeating joints, and that the flux path at the inner leg is reduced only an insignificant amount by the stepping of the major joints.

While FIGS. 20A–20C illustrate a magnetic core in which the leg and yoke laminations have substantially the same width, it will be understood that the teachings of the invention apply equally to magnetic cores in which the yoke laminations are wider than the leg laminations. It will also be understood that while the embodiment shown in FIGS. 20A–20C has been illustrated with six layers, with each major joint only being stepped once, that other modifications may be made by inserting more than one step at part or all of the major joints, which would provide a still greater distribution of the joints and a still greater number of laminations disposed between repeating joints in the same plane.

Cores with both a major and a stepped joint distribution at the inner leg have a disadvantage as compared with a stepped joint distribution at the inner leg from the standpoint that the joint configuration at the inside leg is not a continuous zig-zag or sawtooth joint, but is of a discontinuous nature. This limits the number of punchings or laminations which may be inserted at a time in the top yoking operation which is performed after the windings are loaded or disposed on the winding legs. This limitation in top yoking speed may be avoided by utilizing both a major and a stepped joint distribution between the lower yoke and the inner leg, and only a stepped joint distribution between the upper yoke and the inner leg. For example, the lower half of the core may have a structure such as shown in the lower half of the layers shown in FIGS. 20B and 20C, which provides a stepped major joint distribution, and the upper half of the core may have a structure such as shown in the upper half of FIG. 20B.

While all of the magnetic core structures disclosed herein are illustrated with a single inner leg member, for use with a magnetic core of the three-phase core form type or single phase shell-form type, it will be obvious that the teachings of the invention are applicable to magnetic core structures having more than one inner leg member, such as those utilized with three-phase transformers having a magnetic core of the shell-form type.

It is to be understood that the layers included in the groups of layers of the magnetic cores disclosed are preferably stacked in a predetermined repeating sequence, but the order of stacking the layers may be modified in different groups of the same core. Further, it is to be understood that more than one layer of the same configuration or having the same laminations, up to a preferred maximum of three, may be stacked simultaneously for convenience during assembly and stacking if desired. Still further, it will be understood that the magnetic strip material from which the laminations are formed may have one or more preferred directions of magnetic orientation. In other words, in addition to the magnetic strip material having a first preferred direction of magnetic orientation parallel with the sides of the laminations, the strip may have other directions of preferred magnetic orientation, such as a second preferred direction of magnetic orientation substantially perpendicular to the first preferred direction.

In summary, there has been disclosed new and improved magnetic core structures which may be constructed with substantially no scrap. This is accomplished without seriously affecting the magnetic efficiency of the cores, by introducing a maximum of two square joints per layer of laminations, and distributing the joints between layers of laminations such that at least two laminations separate repeating joints. Further, in addition to being substantially scrapless, the magnetic core structures disclosed are suitable for automatic cutting and semi-automatic stacking.

Since numerous changes may be made in the above-described apparatus and different embodiments of the invention may be made without departing from the spirit thereof, it is intended that all matter contained in the foregoing description or shown in the accompanying drawings, shall be interpreted as illustrative, and not in a limiting sense.

We claim as our invention:

1. A magnetic core comprising:
   a plurality of stacked layers of laminations formed from magnetic strip material having at least one preferred direction of magnetic orientation substantially parallel with the sides of said strip material;
   each of said layers including first and second outer leg laminations, at least one inner leg lamination, and yoke laminations connecting the ends of said leg laminations to form a substantially rectangular core having at least two windows;
   the joint between the adjoining edges of the first and second leg laminations and said yoke laminations in each layer being diagonal with respect to the sides of said laminations;
   the joints between said inner leg lamination and said yoke laminations in each of said layers including two joints which are substantially perpendicular with respect to the sides of certain of said laminations;
   all of the joints between the respective leg and yoke laminations in each of the layers being distributed with respect to the joints in the other layers, with at least two layers of laminations separating repeating joints in the same plane.

2. A magnetic core comprising:
   a plurality of stacked layers of laminations formed from magnetic strip material having at least one preferred direction of magnetic orientation substantially parallel with the sides of said strip material;
   each of said layers including first and second outer leg laminations, at least one inner leg lamination, and yoke laminations connecting the ends of said leg laminations to form a substantially rectangular core having at least two windows;
   said plurality of stacked layers being divided into groups each including at least three layers;
   the joints between the adjoining edges of the first and second leg laminations and said yoke laminations in each of the layers of each group being diagonal with respect to the sides of said laminations and offset from the adjacent joints in the group, with at least two layers of laminations separating repeating joints in the same plane;
   the joints between said inner leg lamination and said yoke laminations in each of said layers including two joints which are substantially perpendicular with respect to the sides of certain of said laminations;
   the joints between the inner leg and yoke laminations in each layer in each group being offset from the joints in the other layers of the group in a predetermined stepped pattern, with at least two layers of laminations separating repeating joints in the same plane.

3. A magnetic core comprising:
   a plurality of stacked layers of laminations formed from a magnetic strip material having at least one preferred direction of magnetic orientation substantially parallel with the side of said strip material;
   each of said layers including first and second outer leg laminations, at least one inner leg lamination, and yoke laminations connecting the ends of said leg laminations to form a substantially rectangular core having at least two windows;
   said plurality of stacked layers being divided into groups each including at least three layers;
   the joints between the adjoining edges of the first and second leg laminations and said yoke laminations in each of the layers of each group being diagonal with respect to the sides of said laminations and offset from the adjacent joints in the group, with at least two layers of laminations separating repeating joints in the same plane;
   the joints between said inner leg lamination and said yoke laminations in each of said layers including two joints which are substantially perpendicular with respect to the sides of certain of said laminations;
   the joints between the inner leg and yoke laminations in each layer in each group being distributed into different major planes with respect to the joints in the other layers of the group, with at least two layers of laminations separating repeating joints in the same plane.

4. A magnetic core comprising:
   a plurality of stacked layers of laminations formed from magnetic strip material having at least one preferred direction of magnetic orientation substantially parallel with the sides of said strip material;
   each of said layers including first and second outer leg laminations, at least one inner leg lamination, and yoke laminations connecting the ends of said leg laminations to form a substantially rectangular core having at least two windows;
   said plurality of stacked layers being divided into groups each including at least four layers;
   the joints between the adjoining edges of the first and second leg laminations and said yoke laminations in each of the layers of each group being diagonal with respect to the sides of said laminations and offset from the adjacent joints in the group, with at least two layers of laminations separating repeating joints in the same plane;
   the joints between said inner leg lamination and said yoke laminations in each of said layers including two joints which are substantially perpendicular with respect to the sides of certain of said laminations;
   certain of the joints between the inner leg and yoke laminations in each layer of each group being distributed into different major planes with respect to the joints in the other layers of the group, the remaining joints between the inner leg and yoke laminations being offset from at least one of the major planes in a predetermined stepped relation, with at least two layers of laminations separating repeating joints in the same plane.

5. A magnetic core comprising:
a plurality of stacked layers of laminations formed from magnetic strip material having at least one preferred direction of magnetic orientation substantially parallel with the sides of said strip material;

each of said layers including first and second outer leg laminations, at least one inner leg lamination, and yoke laminations connecting the ends of said leg laminations to form a substantially rectangular core having at least two substantially rectangular windows;

said plurality of stacked layers being divided into groups each including at least three layers;

the joints between the adjoining edges of the first and second leg laminations and said yoke laminations in each of the layers of each group being diagonal with respect to the sides of the laminations and offset from all of the other joints in the group;

the inner leg laminations of two layers of each group having one end cut diagonally and the other end cut perpendicular with respect to the sides of said laminations;

the inner leg lamination of the remaining layer of each group having both ends cut diagonally;

the joints between the adjoining edges of the inner leg lamination and the yoke laminations being distributed such that none of the joints are aligned with any of the other joints in the same group, and including two joints per layer which are perpendicular to the sides of certain of said laminations.

6. A magnetic core comprising:

a plurality of stacked layers of laminations formed from magnetic strip material having at least one preferred direction magnetic orientation substantially parallel with the sides of said strip material;

each of said layers including first and second outer leg laminations, at least one inner leg lamination, and yoke laminations connecting the ends of said leg laminations to form a rectangular core having at least two rectangular windows;

said plurality of stacked layers being divided into groups each including at least three layers;

the joints between the adjoining edges of the first and second leg laminations and said yoke laminations in each of the layers in each group being diagonal with respect to the sides of said laminations and offset from all the other joints in the group;

the inner leg laminations of two layers of each group having one end cut diagonally and the other end cut perpendicular with respect to the sides of said laminations;

the inner leg lamination of the remaining layer of each group having both ends cut diagonally and parallel with one another to form a lamination having a substantially parallelogram configuration;

the joints between the adjoining edges of the inner leg lamination and the yoke laminations being distributed such that none of the joints are aligned with any of the other joints in the same group, and including two joints per layer which are perpendicular to the sides of certain of said laminations.

7. A magnetic core comprising:

a plurality of stacked layers of laminations formed from magnetic strip material having at least one preferred direction of magnetic orientation substantially parallel with the sides of said strip material;

each of said layers including first and second outer leg laminations, at least one inner leg lamination, and first and second yoke portions each having first and second laminations, said first and second yoke portions connecting the ends of said leg laminations to form a substantially rectangular core having at least two substantially rectangular windows;

said plurality of stacked layers being divided into groups each including at least four layers;

the joints between the adjoining edges of the first and second leg laminations and said yoke laminations in each of the layers of each group being diagonal with respect to the sides of said laminations and offset from all the other joints in the group;

the inner leg laminations of each of the layers in each group having one end cut diagonally and the other end cut perpendicular with respect to the sides of the laminations;

the diagonally cut ends of said inner leg laminations appearing in the first yoke portion in alternate layers of each group, with the diagonal cuts being substantially at right angles to one another, and one of the laminations being longer than the other, to distribute the joints;

the diagonally cut ends of said inner leg laminations appearing in the second yoke portion in the remaining layers of each group, with the diagonal cuts being substantially at right angles to one another, and one of the laminations being longer than the other to distribute the joints, the ends of said inner leg laminations which are cut perpendicular with respect to the sides of the lamination each being butted against a side of one of the yoke laminations, with the yoke laminations which are disposed against the perpendicular cut of the two longer inner leg laminations being narrower in width than the remaining yoke laminations.

8. A magnetic core comprising:

a plurality of stacked layers of laminations formed from magnetic strip material having at least one preferred direction of magnetic orientation substantially parallel with the sides of said strip material;

each of said layers including first and second outer leg laminations, at least one inner leg lamination, and first and second yoke portions each having first and second laminations, said first and second yoke portions connecting the ends of said leg laminations to form a substantially rectangular core having at least two substantially rectangular windows;

said plurality of stacked layers being divided into groups each including at least four layers;

the joints between the adjoining edges of the first and second leg laminations and said yoke laminations in each of the layers of each group being diagonal with respect to the sides of said laminations and offset from all the other joints in the group;

the inner leg laminations of each of the layers in each group having one end cut diagonally and the other end cut perpendicular with respect to the sides of the laminations;

the diagonally cut ends of said inner leg laminations appearing in and extending across the width of the first yoke portion in alternate layers of each group, with the diagonal cuts being substantially at right angles to one another, and one of the laminations being longer than the other to distribute the joints;

the diagonally cut ends of said inner leg laminations appearing in and extending across the width of the second yoke portion in the remaining layers of each group, with the diagonal cuts being substantially at right angles to one another, and one of the laminations being longer than the other to distribute the joints, the ends of said inner leg laminations which are cut perpendicular with respect to the sides of the lamination each being butted against a side of one of the yoke laminations, with the yoke laminations which are disposed against the perpendicular cut of the two longer inner leg laminations being narrower in width than the remaining yoke laminations.

9. A magnetic core comprising:

a plurality of stacked layers of laminations formed from magnetic strip material having at least one preferred direction of magnetic orientation substantially parallel with the sides of said strip material;

each of said layers including first and second outer leg laminations, at least one inner leg lamination, and first and second yoke portions each having a predetermined number of yoke laminations, said first and second yoke portions connecting the ends of said leg laminations to form a substantially rectangular core having at least two substantially rectangular windows;

said plurality of stacked layers being divided into groups each including at least three layers;

the joints between the adjoining edges of the first and second leg laminations and said yoke laminations in each of the layers of each group being diagonal with respect to the sides of said laminations and offset from the other joints in the group;

the inner leg laminations of two of the layers of each group having both ends cut diagonally and each having a length sufficient to reach from the outside of one yoke portion to a predetermined point intermediate the width of the other yoke portion, said inner leg laminations starting at the outside of opposite yoke portions and disposed such that the diagonally cut ends are substantially perpendicular to one another;

the inner leg lamination of the remaining layer of each group having both ends cut perpendicular to the sides of the lamination and having a length sufficient to butt against the inside edges of both yoke portions.

10. A magnetic core comprising:

a plurality of stacked layers of laminations formed from magnetic strip material having at least one preferred direction of magnetic orientation substantially parallel with the sides of said strip material;

each of said layers including first and second outer leg laminations, at least one inner leg lamination, and first and second yoke portions each having first and second laminations, said first and second yoke portions connecting the ends of said leg laminations to form a substantially rectangular core having at least two substantially rectangular windows;

said plurality of stacked layers being divided into groups each including at least four layers;

the joints between the adjoining edges of said first and second leg laminations and said yoke laminations in each of the layers in each group being diagonal with respect to the sides of said laminations and offset from the other joints in the group;

the inner leg laminations of each layer of each group having each end cut diagonally, one end of each inner leg lamination having a step which narrows the width of the lamination for a predetermined distance;

two of the layers of each group having the stepped end of the inner leg lamination disposed in the first yoke portion, with their diagonal cuts disposed substantially perpendicular to one another and their ends extending to substantially the same predetermined locations relative to the width of the first and second yoke portions, the remaining two layers of each group having the stepped ends of the inner leg laminations disposed in the second yoke portions, with their diagonal cuts disposed substantially perpendicular to one another and their ends extending to substantially the same predetermined locations relative to the width of the first and second yoke portions, which predetermined locations are offset from the predetermined locations of the ends of the other two inner leg laminations.

11. A magnetic core comprising:

a plurality of stacked layers of laminations formed from magnetic strip material having at least one preferred direction of magnetic orientation substantially parallel with the sides of said strip material;

each of said layers including first and second outer leg laminations, at least one inner leg lamination, and first and second yoke portions each having first and second laminations;

said first and second yoke portions connecting the ends of said leg laminations to form a substantially rectangular core having at least two rectangular windows;

said plurality of stacked layers being divided into groups each including at least three layers;

the joints between the adjoining edges of the first and second leg laminations and said yoke laminations in each of the layers in each group being diagonal with respect to the sides of said laminations and offset from the other joints in the group;

the inner leg laminations of each layer of each group having each end cut diagonally;

the ends of certain inner leg laminations being stepped to narrow the width of the laminations for a predetermined length, with the overall length of the inner leg laminations being the same and the steps being incrementally different for each inner leg lamination to form joints between the inner leg laminations and yoke portions which are offset from the corresponding joints in the other layers in the group.

12. A magnetic core comprising:

a plurality of stacked layers of laminations formed from magnetic strip material having at least one preferred direction of magnetic orientation substantially parallel with the sides of said strip material;

each of said layers including first and second outer leg laminations, at least one inner leg lamination, and first and second yoke portions each having at least first and second laminations, said first and second yoke portions connecting the ends of said leg laminations to form a substantially rectangular core having at least two substantially rectangular windows;

said plurality of stacked layers being divided into groups each including at least four layers;

the joints between the adjoining edges of the first and second leg laminations and said yoke laminations in each of the layers of each group being diagonal with respect to the sides of said lamination and offset from the other joints in said group;

the inner leg laminations of each layer of each group having each end cut diagonally to form a parallelogram configuration;

each end of each inner leg lamination being stepped to narrow the width of the lamination for a predetermined distance, with the overall length of the inner leg laminations being the same and the steps being incrementally different for each inner leg lamination to form joints between the inner leg laminations and yoke portions which are offset from the corresponding joints in the other layers of the group;

said inner leg laminations extending from the outer surface of the first yoke portion to the outer surface of the second yoke portion.

13. A magnetic core comprising:

a plurality of stacked layers of laminations formed from magnetic strip material having at least one preferred direction of magnetic orientation substantially parallel with the sides of said strip material;

each of said layers including first and second outer leg laminations, at least one inner leg lamination, and first and second yoke portions each having first and second laminations, said first and second yoke portions connecting the ends of said leg laminations to form a substantially rectangular core having at least two substantially rectangular windows;

said plurality of stacked layers being divided into groups each including at least four layers;

the joints between the adjoining edges of the first and second leg laminations and said yoke laminations in each of the layers of each group being diagonal with respect to the sides of said laminations and offset from the other joints in the group;

the inner leg lamination of each layer of each group having each end cut diagonally;

each end of certain inner leg laminations being stepped to narrow the width of the lamination for a predetermined distance, with the overall length of the inner leg laminations being the same and the steps forming a plurality of matching pairs of laminations whose steps are incrementally different from the other pairs, one of each pair of matching laminations being stacked to form joints between the inner leg laminations and yoke portions which are offset from the corresponding joints in the other layers of the group, the remaining lamination of each matching pair being disposed with its diagonal cuts substantially perpendicular to the diagonal cuts of its matching lamination to form additional joints between the inner leg laminations and yoke portions which are offset from the corresponding joints in the other layers of the group;

said inner leg laminations extending from the outer surface of the first yoke portion to the outer surface of the second yoke portion.

14. A magnetic core comprising:

a plurality of stacked layers of laminations formed from magnetic strip material having at least one preferred direction of magnetic orientation substantially parallel with the sides of said strip material;

each of said layers including first and second outer leg laminations, at least one inner leg lamination, and first and second yoke portions, said first and second yoke portions connecting the ends of said leg laminations to form a substantially rectangular core having at least two substantially rectangular windows;

said plurality of stacked layers being divided into groups each including at least three layers;

the joints between the adjoining edges of the first and second leg laminations and said yoke laminations in each of the layers in each group being diagonal with respect to the sides of said laminations and offset from the other joints in the group;

the inner leg lamination of each layer of each group having one end cut diagonally and one end cut perpendicular with respect to the sides of the lamination;

the diagonally cut end on certain inner leg laminations being stepped to narrow the width of the lamination a predetermined amount and for a predetermined distance, with the width of the step being incrementally different on the various laminations to form joints between the diagonally cut ends of the inner leg lamination and the yoke portions which are offset from corresponding joints in other layers of the group;

the overall length of the inner leg laminations being different;

the ends of the diagonally cut ends of said inner leg laminations extending to substantially the same plane to form joints between the perpendicularly cut ends of the inner leg laminations and the second yoke portion which are offset from one another in each group;

certain laminations of the second yoke portion having predetermined incremental steps cut therein to receive the perpendicularly cut ends of said inner leg laminations.

15. A magnetic core comprising:

a plurality of stacked layers of laminations formed from magnetic strip material having at least one preferred direction of magnetic orientation substantially parallel with the sides of said strip material;

each of said layers including first and second outer leg laminations, at least one inner leg lamination, and first and second yoke portions each having at least one lamination, said first and second yoke portions connecting the ends of said leg laminations to form a substantially rectangular core having at least two substantially rectangular windows;

said plurality of stacked layers being divided into groups each including at least three layers;

the joints between the adjoining edges of the first and second outer leg laminations and said yoke laminations in each of the layers of each group being diagonal with respect to the sides of said laminations and offset from the other joints in the group;

the inner leg lamination of each layer of each group having one end cut diagonally and one end cut perpendicular with respect to the sides of the laminations;

the diagonally cut end on certain inner leg laminations being stepped to narrow the width of the lamination a predetermined amount for a predetermined length, with the longitudinal lengths of the steps being the same for all inner leg laminations and the width of the step being incrementally different to form joints between the diagonally cut ends of the inner leg lamination and the first yoke portion which are offset from the corresponding joints in other layers of the group;

the overall length of the inner leg laminations being different;

the ends of the diagonally cut ends of said inner leg laminations extending to the outer surface of the first yoke portion to form joints between the perpendicularly cut ends of the inner leg laminations and the second yoke portions which are offset from one another in each group;

certain laminations of the second yoke portion having predetermined steps cut therein of incrementally different lengths to receive the perpendicularly cut ends of said inner leg laminations.

16. A magnetic core comprising:

a plurality of stacked layers of laminations formed from magnetic strip material having at least one preferred direction of magnetic orientation substantially parallel with the series of said strip material;

each of said layers including first and second outer leg laminations, at least one inner leg lamination, and first and second yoke portions each having at least one lamination, said first and second yoke portions connecting the ends of said leg laminations to form a substantially rectangular core having at least two substantially rectangular windows;

said plurality of stacked layers being divided into groups each including at least three layers;

the joints between the adjoining edges of the first and second leg laminations and said yoke laminations in each of the layers of each group being diagonal with respect to the sides of said laminations and offset from other joints in the group;

the inner leg laminations of each layer of each group having each end cut perpendicularly with respect to sides of the lamination;

the overall length of said inner leg laminations in each group being the same, but stacked with their ends being offset in a predetermined stepped manner;

certain of the laminations of said first and second yoke portions in each group having cutout portions disposed to receive the stepped ends of said inner leg laminations, with the cutout portions narrowing the width of each of the yoke portions an incrementally different amount to form joints between the inner leg lamination and said yoke portions which are offset from one another in each group.

17. A magnetic core comprising:

a plurality of stacked layers of laminations formed from magnetic strip material having at least one preferred direction of magnetic orientation substantially parallel with the sides of said strip material;

each of said layers including first and second outer leg laminations, at least one inner leg lamination, and first and second yoke portions each having first and second laminations, said first and second yoke portions connecting the ends of said leg laminations to form a substantially rectangular core having at least two substantially rectangular windows;
said plurality of stacked layers being divided into groups each including at least three layers;
the joints between the adjoining edges of the first and second leg laminations and said yoke laminations in each of the layers in each group being diagonal with respect to the sides of said laminations and offset from the other joints in the group;
the inner leg lamination of each layer of each group having each end cut perpendicular with respect to the sides of the lamination;
the overall length of said inner leg laminations in each group differing by a predetermined amount;
certain of the laminations of said first and second yoke portions in each group being narrower than the other laminations by incrementally different amounts to allow the differing lengths of said inner leg lamination to butt against the sides of the laminations and form joints which are offset from all the other joints of the group.

18. A magnetic core comprising:
a plurality of stacked layers of laminations formed from magnetic strip material having at least one preferred direction of magnetic orientation substantially parallel with the sides of said strip material;
each of said layers including first and second outer leg laminations, at least one inner leg lamination, and yoke laminations connecting the ends of said leg laminations to form a substantially rectangular core having at least two windows;
the joints between the adjoining edges of the first and second leg laminations and said yoke laminations in each layer being diagonal with respect to the sides of said laminations;
the joints between the adjoining edges of said inner leg lamination and said yoke laminations being distributed to form a plurality of major joint areas, with each major joint area including at least two parallel, incrementally offset joints;
the joints between the adjoining edges of said inner leg lamination and said yoke laminations in each of said layers including two joints which are substantially perpendicular with respect to the sides of said laminations;
all of the joints between said leg and yoke laminations being distributed with respect to the joints in the other layers, with at least three laminations separating repeating joints in the same plane.

19. A magnetic core comprising:
a plurality of stacked layers of laminations formed from magnetic strip material having at least one preferred direction of magnetic orientation substantially parallel with the sides of said strip material;
each of said layers including first and second outer leg laminations, at least one inner leg lamination, and first and second yoke portions having laminations connecting the ends of said leg laminations to form a substantially rectangular core having at least two windows;
the plurality of stacked layers being divided into groups each including at least four layers;
the joints between the adjoining edges of the first and second out leg laminations and said yoke laminations in each of the layers of each group being diagonal with respect to the sides of said laminations and offset from the other joints of the group;
the inner leg laminations of the first, second, third and fourth layers of each group having one end cut diagonally and the other end cut perpendicularly with respect to the sides of the laminations;
the inner leg laminations of the fifth and sixth layers of each group having both ends cut diagonally with respect to the sides of the laminations;
the inner leg laminations of the first and second layers having their diagonally cut ends disposed in the first yoke portion with corresponding cuts on the ends of the laminations being parallel with one another and offset a predetermined amount;
the inner leg laminations of the third and fourth layers having their diagonally cut ends disposed in the second yoke portion, with corresponding cuts on the ends of the laminations being parallel with one another and offset a predetermined amount;
the inner leg laminations of the fifth and sixth layers having one diagonally cut end disposed in the first yoke portion and the other diagonally cut end disposed in the second yoke portion, the corresponding cuts on the ends of the laminations in the fifth and sixth layers being parallel to one another and offset a predetermined amount, the diagonally cut ends which are disposed in the first and second yoke portions of layers five and six being substantially perpendicular to the diagonally cut ends which are disposed in the first yoke portion of layers one and two, and the second yoke portion of layers three and four.

20. A magnetic core comprising:
a plurality of stacked layers of laminations formed from magnetic strip material having at least one preferred direction of magnetic orientation substantially parallel with the sides of said strip material;
each of said layers including first and second outer leg laminations, at least one inner leg lamination having first and second ends, and yoke laminations connecting the ends of said leg laminations to form a substantially rectangular core having at least two windows;
said plurality of stacked layers being divided into groups each including at least three layers;
the joints between the adjoining edges of the first and second leg laminations and said yoke laminations in each of the layers of each group being diagonal with respect to the sides of said laminations and offset from the adjacent joints in the group, with at least two layers of laminations separating repeating joints in the same plane;
the joints between said inner leg lamination and said yoke laminations in each of said layers including two joints which are substantially perpendicular with respect to the sides of certain of said laminations;
the joint between the first end of said inner leg lamination and the adjoining yoke laminations in each layer of each group being offset from the joints in the other layers of the group in a predetermined stepped pattern, with at least two laminations separating repeating joints in the same plane;
certain joints between the second end of said inner leg lamination and the adjoining yoke laminations in each layer of each group being distributed into different major planes with respect to the joints in the other layers of the group, the remaining joints between the second end of said inner leg lamination and the adjoining yoke laminations being offset from at least one of the major planes in a predetermined stepped relation, with at least two layers of laminations separating repeating joints in the same plane.

No references cited.

LEWIS H. MYERS, *Primary Examiner.*